United States Patent
Yamashita et al.

(10) Patent No.: US 10,941,701 B2
(45) Date of Patent: Mar. 9, 2021

(54) SUPERCHARGING SYSTEM AND INTERNAL COMBUSTION ENGINE

(71) Applicant: MITSUBISHI HEAVY INDUSTRIES ENGINE & TURBOCHARGER, LTD., Sagamihara (JP)

(72) Inventors: Yukio Yamashita, Tokyo (JP); Byeongil An, Tokyo (JP); Motoki Ebisu, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 86 days.

(21) Appl. No.: 16/078,300

(22) PCT Filed: Jul. 15, 2016

(86) PCT No.: PCT/JP2016/070954
§ 371 (c)(1),
(2) Date: Aug. 21, 2018

(87) PCT Pub. No.: WO2018/011967
PCT Pub. Date: Jan. 18, 2018

(65) Prior Publication Data
US 2019/0048792 A1  Feb. 14, 2019

(51) Int. Cl.
*F02B 39/00* (2006.01)
*F02B 37/013* (2006.01)
(Continued)

(52) U.S. Cl.
CPC .............. *F02B 39/005* (2013.01); *F01P 3/00* (2013.01); *F02B 37/00* (2013.01); *F02B 37/004* (2013.01);
(Continued)

(58) Field of Classification Search
CPC . F01P 3/00; F02B 37/00; F02B 37/004; F02B 37/013; F02B 37/04; F02B 37/18;
(Continued)

(56) References Cited

U.S. PATENT DOCUMENTS 6,647,724 B1   11/2003   Arnold et al.
7,025,579 B2   4/2006   Woollenweber et al.
(Continued)

FOREIGN PATENT DOCUMENTS

CN   102472163 A   5/2012
CN   104736814 A   6/2015
(Continued)

OTHER PUBLICATIONS

Office Action dated May 28, 2019 issued in corresponding Japanese Application No. 2018-527348 with an English translation.
(Continued)

*Primary Examiner* — Jesse S Bogue
(74) *Attorney, Agent, or Firm* — Birch, Stewart, Kolasch & Birch, LLP.

(57) ABSTRACT

The supercharging system and the internal combustion engine according to the present invention are provided with: a first supercharger (20); a second supercharger (30); an electric motor (23) connected to a shaft end of a first compressor (21); a generator (24) connected to a shaft end of a first turbine (22); a bypass exhaust pipe (L6) that allows exhaust air to bypass the first turbine (22); a cooler (51) that cools the generator (24); and a control device (50) that activates the cooler (51) when the generator (24) is driven by exhaust air that has driven the first turbine (22).

15 Claims, 11 Drawing Sheets

(51) Int. Cl.
| | |
|---|---|
| *F02B 37/04* | (2006.01) |
| *F02B 37/18* | (2006.01) |
| *F02B 37/00* | (2006.01) |
| *F02B 39/10* | (2006.01) |
| *H02K 11/25* | (2016.01) |
| *F01P 3/00* | (2006.01) |
| *H02K 7/18* | (2006.01) |
| *H02K 9/19* | (2006.01) |

(52) U.S. Cl.
CPC ............ *F02B 37/013* (2013.01); *F02B 37/04* (2013.01); *F02B 37/18* (2013.01); *F02B 39/10* (2013.01); *H02K 7/1823* (2013.01); *H02K 9/19* (2013.01); *H02K 11/25* (2016.01); *Y02T 10/12* (2013.01)

(58) Field of Classification Search
CPC ....... F02B 39/005; F02B 39/10; H02K 11/25; H02K 7/1823; H02K 9/19; Y02T 10/144
See application file for complete search history.

(56) References Cited

U.S. PATENT DOCUMENTS

| | | | | |
|---|---|---|---|---|
| 7,469,689 | B1* | 12/2008 | Jones | F02B 33/40 |
| | | | | 123/41.31 |
| 7,946,118 | B2* | 5/2011 | Hippen | F01M 11/02 |
| | | | | 184/6.16 |
| 9,046,104 | B2* | 6/2015 | Kitsukawa | F02D 23/00 |
| 9,273,598 | B2* | 3/2016 | An | F02B 39/10 |
| 9,670,831 | B2* | 6/2017 | Hotta | B60W 10/08 |
| 10,030,575 | B2* | 7/2018 | Kurtz | F02M 35/10157 |
| 2011/0107739 | A1* | 5/2011 | Shimizu | F02D 21/08 |
| | | | | 60/273 |
| 2012/0121447 | A1 | 5/2012 | Hayashi et al. | |
| 2015/0322851 | A1 | 11/2015 | Cavagnaro et al. | |
| 2015/0337850 | A1 | 11/2015 | An et al. | |
| 2015/0369179 | A1* | 12/2015 | Hotta | F02D 41/0065 |
| | | | | 123/568.12 |
| 2016/0265422 | A1 | 9/2016 | Yamashita et al. | |
| 2017/0058840 | A1* | 3/2017 | Wu | F01N 5/04 |
| 2017/0363024 | A1 | 12/2017 | Sivaraman et al. | |

FOREIGN PATENT DOCUMENTS

| | | |
|---|---|---|
| EP | 2 789 826 A1 | 10/2014 |
| EP | 3 037 640 A1 | 6/2016 |
| JP | 5-256165 A | 10/1993 |
| JP | 2005-127307 A | 5/2005 |
| JP | 2008-267260 A | 11/2008 |
| JP | 2009-270468 A | 11/2009 |
| JP | 2010-190145 A | 9/2010 |
| JP | 2012-92710 A | 5/2012 |
| JP | 2012-97611 A | 5/2012 |
| JP | 2015-108330 A | 6/2015 |
| JP | 5777796 B2 | 7/2015 |
| JP | 2016-118136 A | 8/2016 |
| WO | WO 2010/039197 A1 | 4/2010 |

OTHER PUBLICATIONS

Extended European Search Report dated Mar. 15, 2019 issued in correspondig European Patent Application No. 16908868.9.
International Search Report of the International Searching Authority dated Sep. 20, 2016 in International Application No. PCT/JP2016/070954.
Written Opinion of the International Searching Authority dated Sep. 20, 2016 in International Application No. PCT/JP2016/070954.
Japanese Office Action for Japanese Application No. 2018-527348, dated Nov. 5, 2019, with an English translation.
Office Action dated Mar. 27, 2020 issued in corresponding Chinese Application No. 201680082687.5 with an English Translation.

* cited by examiner

SUPERCHARGING SYSTEM AND INTERNAL COMBUSTION ENGINE

TECHNICAL FIELD

The present invention relates to a turbocharging system which drives a compressor using exhaust gas discharged from an exhaust turbine so as to perform turbocharging and an internal combustion engine having the turbocharging system.

BACKGROUND ART

For example, a turbocharger is installed on an internal combustion engine mounted on an automobile in order to improve fuel consumption. The turbocharger uses exhaust gas discharged from the internal combustion engine so as to drive a turbine and a compressor and compresses intake air to supply the compressed intake air to the internal combustion engine in order to improve output of the internal combustion engine. Meanwhile, there is also a turbocharger which drives a compressor by an electric motor to compress intake air to supply the compressed intake air to the internal combustion engine in order to improve output of the internal combustion engine.

For example, as the turbochargers, there is a turbocharger disclosed in PTL 1. An turbocharging and exhaust gas purification system of an internal combustion engine disclosed in PTL 1 includes an electric compressor which rotationally drives a compressor by an electric motor so as to compress air and to supply the compressed air to the internal combustion engine, a turbine generator which drives a generator by a turbine driven by exhaust gas from the internal combustion engine so as to generate electricity, and electric storage means for storing the electricity generated by the turbine generator and supplying the electricity to the electric compressor.

CITATION LIST

Patent Literature

[PTL 1] Japanese Unexamined Patent Application Publication No. 2010-190145

SUMMARY OF INVENTION

Technical Problem

Meanwhile, the turbocharging and exhaust gas purification system of the internal combustion engine in the related art includes the electric motor which drives the compressor and a generator which is driven by the turbine. In this case, there is a concern that performance of the electric motor or the generator may deteriorate or may be damaged due to heat by the electric motor or the generator. In addition, the generator is directly connected to the turbine which is driven by a high-temperature exhaust gas, and thus, the generator is also heated by exhaust heat. Accordingly, it is necessary to sufficiently cool the generator or the electric motor.

The present invention is made to solve the above-described problems, and an object thereof is to provide a turbocharging system and an internal combustion engine capable of favorably cooling a generator to improve performance.

Solution to Problem

In order to achieve the above-described object, according to an aspect of the present invention, there is provided a turbocharging system including: a first compressor and a first turbine which are coaxially connected to each other; a second compressor and a second turbine which are coaxially connected to each other; an intake line through which intake air pressurized by the first compressor is supplied to the second compressor; an exhaust line through which exhaust gas which has driven the second turbine is supplied to the first turbine; an electric motor which is connected to a shaft end of the first compressor or the second compressor; a generator which is connected to a shaft end of the first turbine or the second turbine; a bypass exhaust line through which the exhaust gas bypasses the first turbine or the second turbine to which the generator is connected; a cooler which cools the generator; and a control device which operates the cooler when the generator is driven by the exhaust gas which has driven the first turbine or the second turbine.

Accordingly, the cooler is operated when the generator is driven by the exhaust gas which has driven the first turbine or the second turbine, and thus, the generator is cooled by the cooler, an increase in temperature of the generator is suppressed, and it is possible to effectively cool the generator so as to improve performance of the generator.

In the turbocharging system of the present invention, the control device starts an operation of the cooler if the generator reaches a predetermined rotation speed set in advance.

Accordingly, if the generator reaches the predetermined rotation speed, the operation of the cooler starts. Therefore, the cooler is operated only when the generator is to be cooled, and thus, efforts for operating the cooler can be prevented from being wastefully used.

In the turbocharging system of the present invention, an exhaust on-off valve is provided in the bypass exhaust line, and the control device operates the cooler after the exhaust on-off valve is closed.

Accordingly, the cooler is operated when an introduction destination of the exhaust gas from the second turbine is switched from the bypass exhaust line to the exhaust pipe, and thus, the generator is cooled by the cooler at an appropriate timing, and it is possible to appropriately suppress an increase in temperature of the generator.

In the turbocharging system of the present invention, the cooler includes a cooling line through which a cooling medium is introduced to the generator so as to cool the generator and a cooling on-off valve which is provided in the cooling line, and the control device opens the cooling on-off valve when the generator is driven.

Accordingly, the cooler is configured to introduce the cooling medium to the generator so as to cool the generator and introduce the cooling medium to the generator when the generator is driven so as to cool the generator, and thus, it is possible to effectively cool the generator by a simple configuration.

In the turbocharging system of the present invention, an intercooler which cools the intake air pressurized by the second compressor is provided, and the cooler introduces a portion of a cooling medium of the intercooler to the generator so as to cool the generator.

Accordingly, a portion of the cooling medium which cools the intercooler is introduced to the generator so as to cool the generator, and thus, it is possible to suppress an increase in an equipment cost by using the cooling medium of the existing equipment.

In the turbocharging system of the present invention, an intercooler which cools the intake air pressurized by the second compressor by a cooling medium of an internal combustion engine is provided, and the cooler introduces a portion of the cooling medium of the internal combustion engine to the generator so as to cool the generator.

Accordingly, a portion of the cooling medium which cools the internal combustion engine is introduced to the generator so as to cool the generator, and thus, it is possible to suppress an increase in an equipment cost by using the cooling medium of the existing equipment.

In the turbocharging system of the present invention, an internal combustion engine cooling line through which a cooling medium circulates through the internal combustion engine so as to cool the internal combustion engine and an intercooler cooling line through which the cooling medium circulates through the intercooler so as to cool the intake air pressurized by the second compressor are provided, and the cooler introduces a portion of the cooling medium of the intercooler cooling line to the generator so as to cool the generator.

Accordingly, in addition to the cooling medium which cools the internal combustion engine, a portion of the cooling medium which cools only the intercooler is introduced to the generator so as to cool the generator, and thus, the generator is cooled by the cooling medium having a lower temperature. Therefore, it is possible to improve cooling efficiency of the generator.

In the turbocharging system of the present invention, a bearing cooling device which cools a bearing of the first turbine or the second turbine is provided, and the cooler introduces a portion of a cooling medium of the bearing cooling device to the generator so as to cool the generator.

Accordingly, a portion of the cooling medium in the bearing cooling device of the first turbine or the second turbine is introduced to the generator so as to cool the generator, and thus, it is possible to suppress an increase in an equipment cost by using the cooling medium of the existing equipment.

In the turbocharging system of the present invention, a bearing lubricating device which lubricates a bearing of the first turbine or the second turbine is provided, and the cooler introduces a portion of a lubricating medium of the bearing lubricating device to the generator so as to cool the generator.

In addition, a portion of the lubricating medium in the bearing lubricating device of the first turbine or the second turbine is introduced to the generator so as to cool the generator, and thus, it is possible to suppress an increase in an equipment cost by using the lubricating medium of the existing equipment as the cooling medium.

In the turbocharging system of the present invention, the cooler introduces a portion of the intake air pressurized by the first compressor or the second compressor driven by the electric motor to the generator so as to cool the generator.

Accordingly, a portion of the intake air pressurized by the first compressor or the second compressor driven by the electric motor is introduced to the generator so as to cool the generator, and thus, the intake pipe may be partially added, and it is possible to suppress an increase in an equipment cost.

In the turbocharging system of the present invention, the cooler sucks outside air by a suction force generated by the first compressor or the second compressor to which the electric motor is connected, and introduces the outside air to the generator so as to cool the generator.

Accordingly, the outside air is sucked by the suction force generated by the first compressor or the second compressor which is driven and rotated by the electric motor and is introduced to the generator so as to cool the generator, and thus, the intake pipe may be partially added, and it is possible to suppress an increase in the equipment cost.

In the turbocharging system of the present invention, the cooler cools the generator and the electric motor.

Accordingly, the cooler cools not only the generator but also the electric motor, and thus, increases in temperature of the generator and the electric motor are suppressed. Therefore, it is possible to improve performance of the entire turbocharger.

In the turbocharging system of the present invention, a temperature sensor which measures a temperature of the generator is provided, and the control device operates the cooler if the temperature of the generator measured by the temperature sensor exceeds a preset upper limit temperature.

Accordingly, the cooler is operated if the temperature of the generator exceeds the upper limit temperature. Therefore, the cooler is operated only when the generator is to be cooled, and thus, efforts for operating the cooler can be prevented from being wastefully used.

In the turbocharging system of the present invention, the control device adjusts a supply amount of a cooling medium supplied to the generator by the cooler according to the temperature of the generator measured by the temperature sensor.

Accordingly, the supply amount of the cooling medium supplied to the generator is adjusted according to the temperature of the generator. Therefore, the temperature of the generator can be maintained at an appropriate temperature, overcooling of the generator is suppressed, and thus, it is possible to prevent the cooler from being wastefully operated.

In addition, according to another aspect of the present invention, there is provided an internal combustion engine including the above-described turbocharging system.

Accordingly, in the turbocharging system, the cooler is operated when the generator is driven by the exhaust gas which has driven the first turbine or the second turbine, the generator is cooled by the cooler, and thus, an increase in temperature of the generator is suppressed. Therefore, the generator can be effectively cooled, performance of the generator can be improved, and as a result, efficiency of the internal combustion engine can be improved.

Advantageous Effects of Invention

According to the turbocharging system and the internal combustion engine of the present invention, the cooler is operated so as to cool the generator when the generator is driven by the exhaust gas which has driven the first turbine or the second turbine, and thus, the generator can be effectively cooled, and performance of the generator can be improved.

DESCRIPTION OF EMBODIMENTS

Hereinafter, preferred embodiments of a turbocharging system and an internal combustion engine according to the present invention will be described in detail with reference to the drawings. In addition, the present invention is not limited by the embodiments, and in a case where a plurality of embodiments are provided, the present invention includes a combination of the respective embodiments.

First Embodiment

Figure 1:
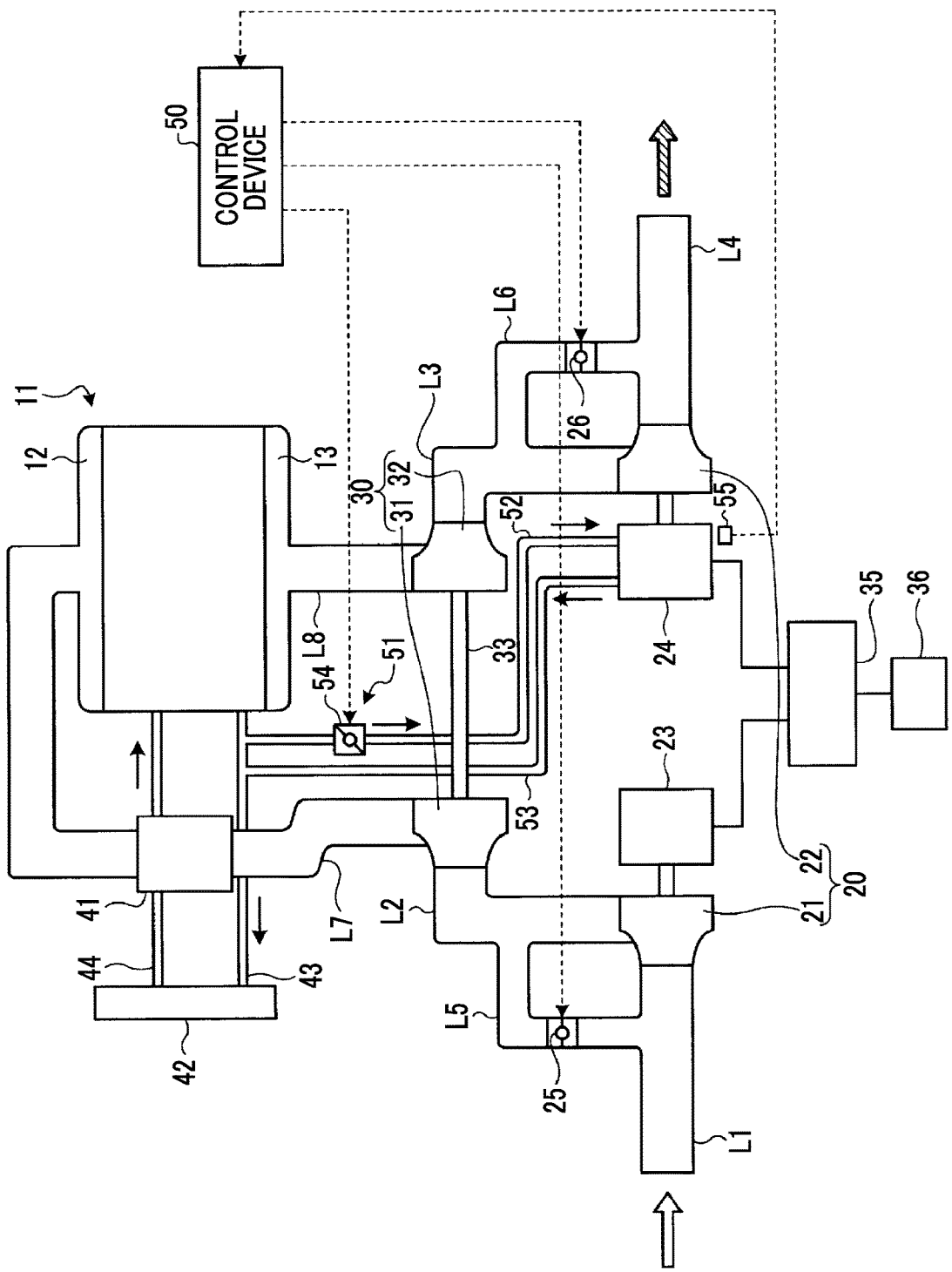
FIG. 1 is a schematic configuration diagram showing a turbocharging system of a first embodiment.

FIG. 1 is a schematic configuration diagram showing a turbocharging system of a first embodiment.

In the turbocharging system of the first embodiment, although it is not shown, an engine (internal combustion engine) 11 includes a plurality of cylinders formed in an engine body, a piston is supported by each cylinder to be movable vertically, and a lower portion of each piston is connected to a crank shaft. In the engine body, a combustion chamber is formed in an upper portion of each cylinder, an intake port and an exhaust port are formed above each combustion chamber, an intake valve is provide in the intake port, and an exhaust valve is provided in the exhaust port.

In the engine 11, an intake manifold 12 is mounted on one side portion of the engine body, and an exhaust manifold 13 is mounted on the other side portion thereof. The intake manifold 12 communicates with the combustion chamber via each intake port, and the exhaust manifold 13 communicates with the combustion chamber via each exhaust port. In addition, an injector which injects a fuel to the intake port or the combustion chamber is provided in the engine body.

A first turbocharger 20 is an electric low-pressure turbocharger, includes a first compressor 21 and a first turbine 22, and is configured such that an electric motor is connected to a rotating shaft of the first compressor 21 and a generator 24 is connected to a rotating shaft of the first turbine 22. A first intake pipe (first intake line) L1 through which air is sucked from the outside is connected to the first compressor 21, and a second intake pipe (second intake line) L2 through which compressed air is supplied is connected to the first compressor 21. A first exhaust pipe (first exhaust line) L3 is connected to the first turbine 22 and a second exhaust pipe (second exhaust line) L4 through which exhaust gas is discharged to the outside is connected to the first turbine 22.

In addition, a base end portion of a bypass intake pipe (bypass intake line) L5 which bypass the first compressor 21 is connected to the first intake pipe L1 and the other end portion thereof is connected to the second intake pipe L2. A base end portion of a bypass exhaust pipe (bypass exhaust line) L6 which bypasses the first turbine 22 is connected to the first exhaust pipe L3 and the other end portion thereof is connected to the second exhaust pipe L4. Moreover, an intake on-off valve 25 is provided in the bypass intake pipe L5 and an exhaust on-off valve 26 is provided in the bypass exhaust pipe L6. Each of the intake on-off valve 25 and the exhaust on-off valve 26 is an on-off valve which stops at a fully open position and a fully closed position or a flow control valve which can adjust an opening degree.

The second turbocharger 30 is an exhaust type high-pressure turbocharger and is configured such that a second compressor 31 and a second turbine 32 are coaxially connected to each other via a rotating shaft 33, and the second compressor 31 and the second turbine 32 are integrally rotated by the rotating shaft 33. The first intake pipe L1 to which the compressed air is supplied from the first compressor 21 of the first turbocharger 20 is connected to the second compressor 31, and a third intake pipe (third intake line) L7 leading to the intake manifold 12 of the engine 11 is connected to the second compressor 31. A third exhaust pipe (third exhaust line) L8 leading to the exhaust manifold 13 of the engine 11 is connected to the second turbine 32, and the first exhaust pipe L3 through which the exhaust gas is supplied to the first turbine 22 of the first turbocharger 20 is connected to the second turbine 32.

In addition, an AC/DG/AC converter (hereinafter, referred to as a converter) 35 is connected to the electric motor 23 and the generator 24, and a capacitor (battery) 36 is connected to the converter 35. In this case, each of the electric motor 23 and the generator 24 may be provided with a dedicated converter and a dedicated capacitor.

Accordingly, in the first turbocharger 20, if the first compressor 21 is driven and rotated by the electric motor 23, air sucked from the first intake pipe L1 is compressed, and thereafter, the compressed air passes through the second compressor 31 of the second turbocharger 30 from the second intake pipe L2, and thus, the compressed air can be supplied from the intake manifold 12 to the combustion chamber of the engine 11. In the engine 11, the exhaust gas (combustion gas) is discharged to the exhaust manifold 13, the second turbine 32 is driven and rotated by the exhaust gas supplied from the exhaust manifold 13 through the third exhaust pipe L8, and thus, the second turbocharger 30 can drive and rotate the second compressor 31. In the first turbocharger 20, the first turbine 22 is driven and rotated by the exhaust gas supplied from the second turbine 32 through the first exhaust pipe L3, and thus, the generator 24 can be driven. The exhaust gas which has passed through the first turbine 22 is discharged from the second exhaust pipe L4 to the outside.

In this case, in the capacitor 36, stored power is converted by the converter 35 to be able to be supplied to the electric motor 23, and power generated by the generator 24 is converted by the converter 35 to be able to be stored. In addition, if the intake on-off valve 25 is opened, air bypasses the first compressor 21 of the first turbocharger 20 through the bypass intake pipe L5, and thus, the air can be directly sucked to the second compressor 31 of the second turbocharger 30. Moreover, if the exhaust on-off valve 26 is opened, the exhaust gas bypasses the first turbine 22 of the first turbocharger 20 through the bypass exhaust pipe L6, and thus, the exhaust gas can be directly discharged from the second turbine 32 of the second turbocharger 30.

The engine 11 includes a water jacket (not shown) which cools the engine body. In addition, an intercooler 41 which cools the air compressed by the second compressor 31 is provided in the third intake pipe L7. Moreover, a first engine cooling water supply pipe (internal combustion engine cooling line) 43 through which a cooling water (cooling medium) of the water jacket is supplied to a radiator 42 is provided, and a second engine cooling water supply pipe (internal combustion engine cooling line) 44 through which the cooling water cooled by the radiator 42 is supplied to the water jacket via the intercooler 41 is provided. In this case, the engine 11 includes a water pump (not shown) which is operated by driving of the engine body, and the cooling water of the water jacket can be circulated to the water jacket via the first engine cooling water supply pipe 43, the radiator 42, the second engine cooling water supply pipe 44, and the intercooler 41 by the water pump.

The turbocharging system of the present embodiment includes a cooler 51 which cools the generator 24 driven by the first turbine 22 of the first turbocharger 20. The cooler 51 introduces a portion of the cooling water (cooling medium) of the intercooler 41 to the generator 24 so as to cool the generator 24, and specifically, the cooler 51 introduces a portion of the cooling water of the water jacket for cooling the engine 11 to the generator 24 so as to cool the generator 24.

That is, the first engine cooling water supply pipe includes a third engine cooling water supply pipe 52 and the fourth engine cooling water supply pipe 53 which branch off from an intermediate portion of the first engine cooling water supply pipe 43 and extend to the generator 24, and a cooling on-off valve 54 is provided in the third engine cooling water supply pipe 52. The cooling on-off valve 54 is an on-off valve which stops at a fully open position and a fully closed position or a flow control valve which can adjust an opening degree. In addition, in the generator 24, a water jacket, a cooling water pipe, or the like is provided outside a generator body (not shown), the cooling water is supplied to the water jacket, the cooling water pipe, or the like, and thus, the generator body is cooled.

Accordingly, at the time of driving of the engine 11, when the cooling water of the water jacket is fed to the first engine cooling water supply pipe 43 by the water pump, if the cooling on-off valve 54 is opened, a portion of the cooling water flowing through the first engine cooling water supply pipe 43 is supplied from the third engine cooling water supply pipe 52 to the generator 24 so as to cool the generator 24. The cooling water which has cooled the generator 24 is returned from the fourth engine cooling water supply pipe 53 to the first engine cooling water supply pipe 43.

A control device 50 can open and close the intake on-off valve 25, the exhaust on-off valve 26, and the cooling on-off valve 54 according to an operation state (a load, a rotation speed, or the like) of the engine 11. In the present embodiment, when the generator 24 is driven by the exhaust gas which has driven the first turbine 22 of the first turbocharger 20, the control device 50 operates the cooler 51. That is, the control device 50 closes the exhaust on-off valve 26 to introduce the exhaust gas into the first turbine 22, and opens the cooling on-off valve if a rotation speed (which is the same as a rotation speed of the generator 24) of the first turbine 22 reaches a predetermined rotation speed set in advance after a predetermined time elapses. The predetermined rotation speed is a rotation speed at which a decrease in efficiency of the generator 24 starts when the rotation speed of the first turbine 22 increases to drive the generator 24, and it is preferable that the predetermined rotation speed is set by an experiment in advance. Accordingly, a portion of the cooling water of the engine is supplied from the third engine cooling water supply pipe 52 to the generator 24, and thus, the generator 24 can be cooled.

Moreover, a temperature sensor 55 which measures a temperature of the generator 24 is provided, and a detection result of the temperature sensor 55 is input to the control device 50. Accordingly, if the temperature of the generator 24 measured by the temperature sensor 55 exceeds a preset upper limit temperature, the control device 50 operates the cooler 51. In this case, for example, the upper limit temperature is a temperature at which performance of the generator 24 significantly decreases. In addition, if the generator 24 is driven, the control device 50 operates the cooler 51. However, the control device 50 may be configured to operate the cooler 51 if the temperature of the generator 24 exceeds the upper limit temperature regardless of a drive state of the generator 24, or may be configured to operate the cooler 51 if the generator 24 is driven and the temperature of the generator 24 exceeds the upper limit temperature. In addition, when the cooler 51 is operated, the control device 50 may adjust a supply amount of the cooling water supplied to the generator 24 by adjusting the opening degree of the cooling on-off valve (flow control valve) 54 according to the temperature of the generator 24 measured by the temperature sensor 55.

Figure 2:
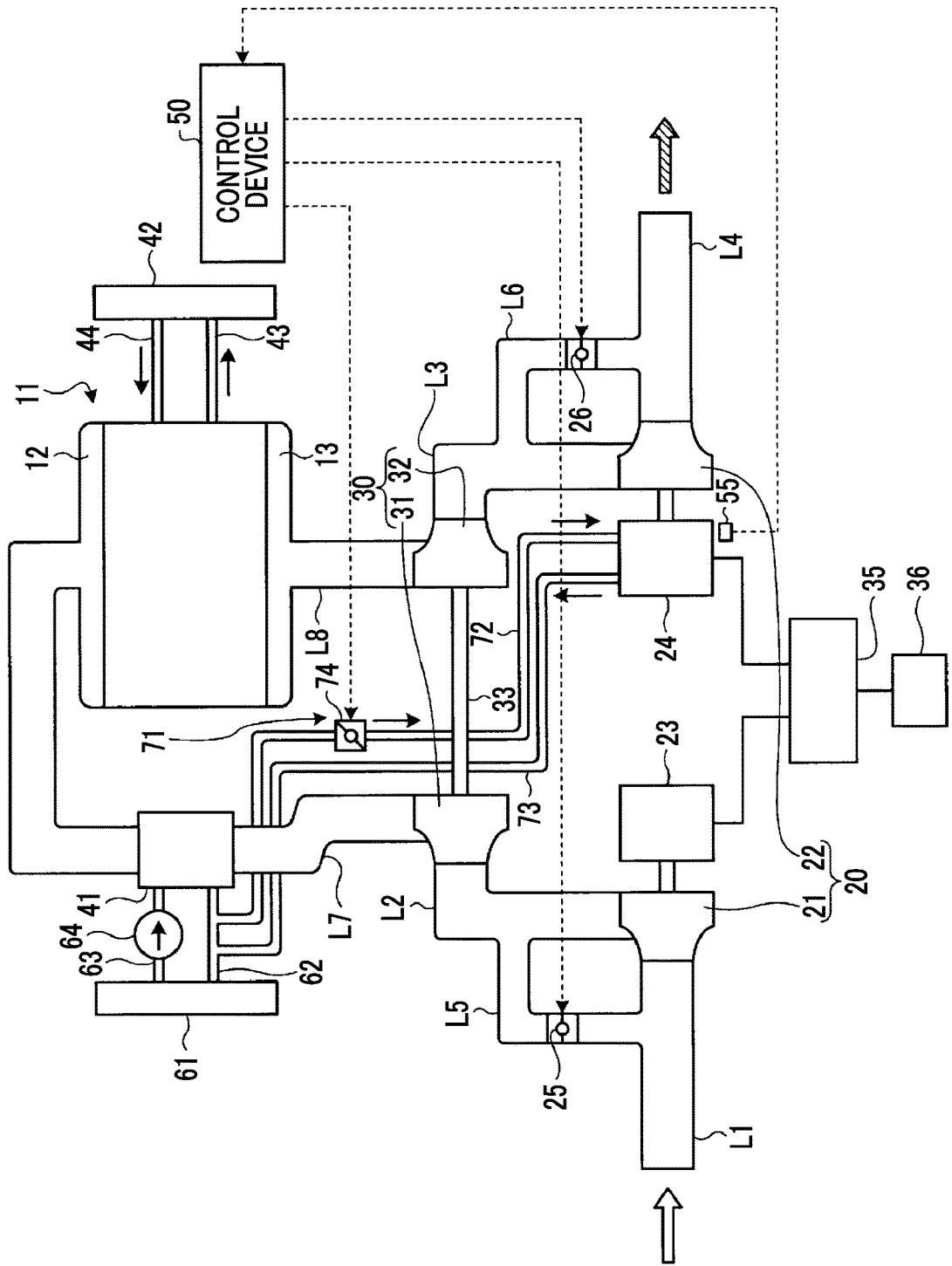
FIG. 2 is a schematic configuration diagram showing a turbocharging system of a first modification example of the first embodiment.

In addition, in the above-described embodiment, the cooler 51 supplies a portion of the cooling water of the engine to the generator 24 so as to cool the generator 24. However, the present invention is not limited to this. FIG. 2 is a schematic configuration diagram showing a turbocharging system of a first modification example of the first embodiment.

In the first modification example of the first embodiment, as shown in FIG. 2, the first engine cooling water supply pipe 43 through which the cooling water of the water jacket is supplied to the radiator 42 is provided, and the second engine cooling water supply pipe 44 through which the cooling water cooled by the radiator 42 is supplied to the water jacket is provided. Moreover, a first intercooler cooling water supply pipe (intercooler cooling line) 62 through which the cooling water (cooling medium) of the intercooler 41 is supplied to a radiator 61 is provided, a second intercooler cooling water supply pipe (intercooler cooling line) 63 through which the cooling water cooled by the radiator 61 is supplied to the intercooler 41 is provided, and a cooling water pump 64 is provided in the second intercooler cooling water supply pipe 63. Accordingly, independently of the driving of the engine 11, the cooling water of the intercooler 41 can be circulated to the intercooler 41 via the first intercooler cooling water supply pipe 62, the radiator 61, and the second intercooler cooling water supply pipe 63 by the cooling water pump 64.

A cooler 71 which cools the generator 24 introduces a portion of the cooling water of the intercooler 41 to the generator 24 so as to cool the generator 24. That is, the first intercooler cooling water supply pipe 62 includes a third intercooler cooling water supply pipe 72 and a fourth intercooler cooling water supply pipe 73 which branch off from an intermediate portion of the first intercooler cooling water supply pipe 62 and extend to the generator 24, and a cooling on-off valve 74 is provided in the third intercooler cooling water supply pipe 72.

Accordingly, when the cooling water of the intercooler 41 is fed to the first intercooler cooling water supply pipe 62 by the cooling water pump 64, if the cooling on-off valve 74 is opened, a portion of the cooling water flowing through the first intercooler cooling water supply pipe 62 is supplied from the third intercooler cooling water supply pipe 72 to the generator so as to cool the generator 24. The cooling water which has cooled the generator 24 is returned from the fourth intercooler cooling water supply pipe 73 to the first intercooler cooling water supply pipe 62.

When the generator 24 is driven by the exhaust gas which has driven the first turbine 22 of the first turbocharger 20, the control device 50 operates the cooler 71. Accordingly, the control device 50 opens the cooling on-off valve 74 after the exhaust on-off valve 26 is closed. Therefore, a portion of the cooling water of the intercooler is supplied from the third intercooler cooling water supply pipe 72 to the generator 24, and thus, the generator 24 can be cooled. In this case, an amount (a speed of the cooling water) of the cooling water circulated by the cooling water pump 64 may increase.

Figure 3:
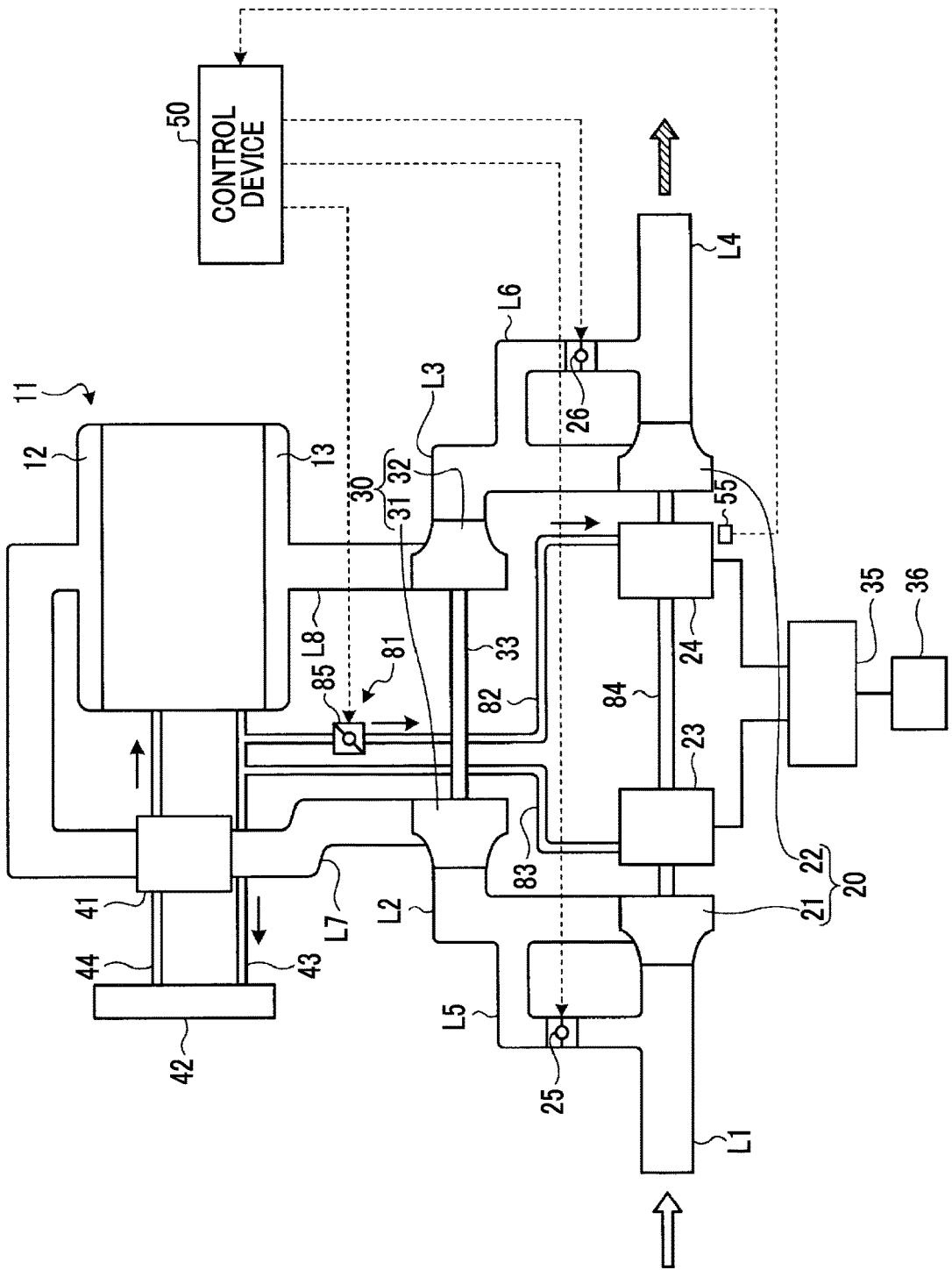
FIG. 3 is a schematic configuration diagram showing a turbocharging system of a second modification example of the first embodiment.

In addition, in the above-described embodiment, the coolers 51 and 71 cools only the generator 24. However, the present invention is not limited to this configuration. FIG. 3 is a schematic configuration diagram showing a turbocharging system of a second modification example of the first embodiment.

In the second modification example of the first embodiment, as shown in FIG. 3, a cooler 81 which cools the generator 24 introduces a portion of the cooling water of the intercooler 41 to the generator 24 so as to cool the generator 24. That is, the first engine cooling water supply pipe 43 includes a third engine cooling water supply pipe 82 which branches off from an intermediate portion of the first engine cooling water supply pipe 43 and extends to the generator 24, a fourth engine cooling water supply pipe 83 which breaches off from the intermediate portion and extends to the electric motor 23, and a fifth engine cooling water supply pipe 84 which connects the generator 24 and the electric motor 23 to each other, and a cooling on-off valve 85 is provided in the third engine cooling water supply pipe 82.

Accordingly, at the time of driving of the engine 11, when the cooling water of the water jacket is fed to the first engine cooling water supply pipe 43 by the water pump, if the cooling on-off valve 85 is opened, a portion of the cooling water flowing through the first engine cooling water supply pipe 43 is supplied from the third engine cooling water supply pipe 82 to the generator 24 so as to cool the generator 24. In addition, the cooling water which has cooled the generator 24 is supplied from the fifth engine cooling water supply pipe 84 to the electric motor 23 so as to cool the electric motor 23. The cooling water which has cooled the electric motor 23 is returned from the fourth engine cooling water supply pipe 83 to the first engine cooling water supply pipe 43.

When the generator 24 is driven by the exhaust gas which has driven the first turbine 22 of the first turbocharger 20, the control device 50 operates the cooler 81. That is, the control device 50 opens the cooling on-off valve 85 after the exhaust on-off valve 26 is closed. Therefore, a portion of the cooling water of the intercooler is supplied from the third engine cooling water supply pipe 82 to the generator 24, and thus, the generator 24 can be cooled. In addition, the cooling water which had cooled the generator 24 is supplied from the fifth engine cooling water supply pipe 84 to the electric motor 23, and thus, the electric motor 23 can be cooled.

In addition, the turbocharging system of the second modification example can be applied to the turbocharging system of the first modification example.

Figure 4:
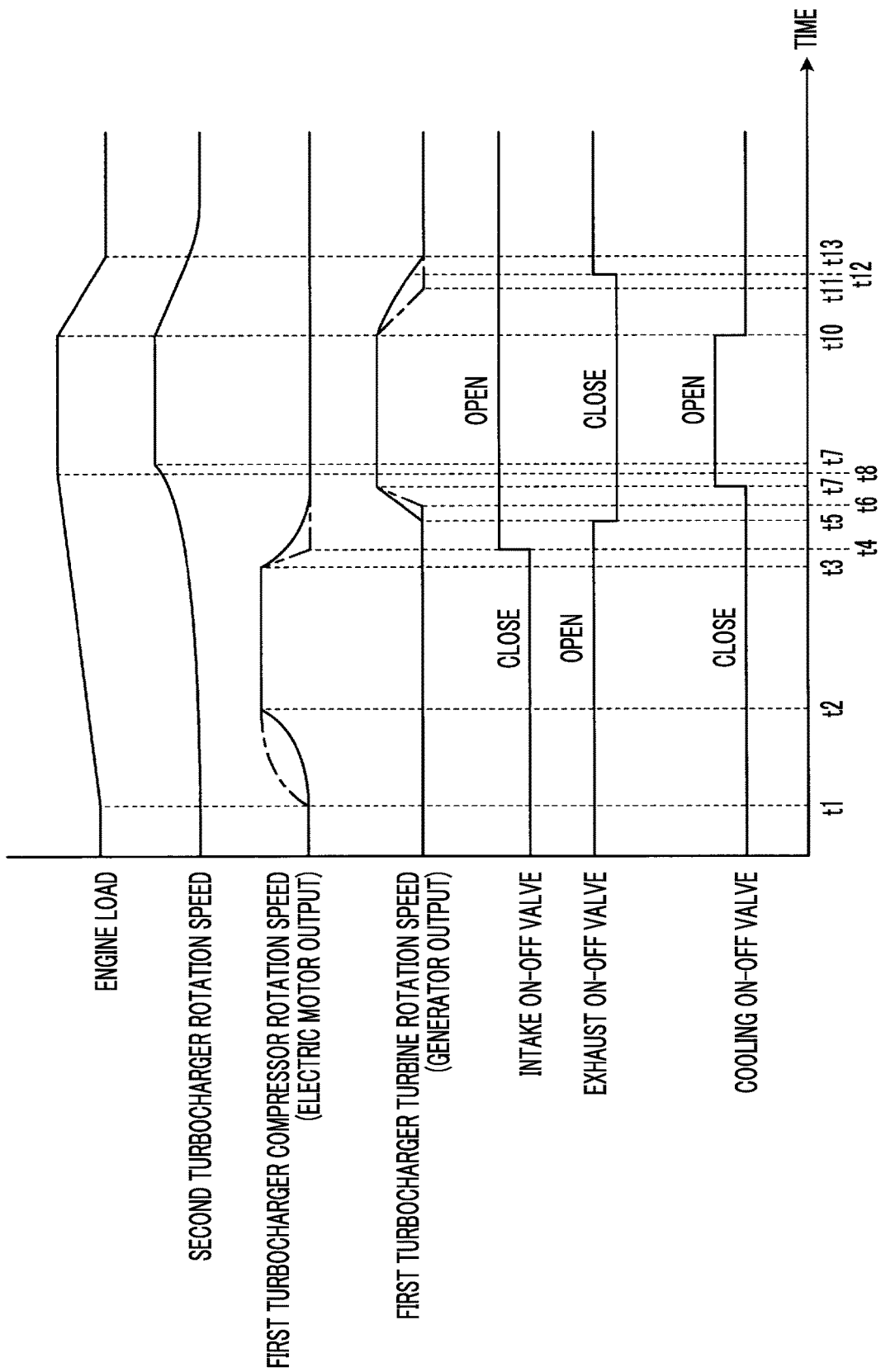
FIG. 4 is a time chart showing an operation method of the turbocharging system.

Here, an operation of the turbocharging system of the present embodiment will be described. In addition, an operation of each of the turbocharging systems of respective modification example is similar to that of the present embodiment. FIG. 4 is a time chart showing an operation method of the turbocharging system.

As shown in FIGS. 1 to 4, in the turbocharging system of the present embodiment, if the engine 11 starts at a time t1 and a required load of the engine increases, the exhaust on-off valve 26 is opened while the intake on-off valve 25 is closed, and thus, the electric motor 23 of the first turbocharger 20 is driven so as to drive and rotate the first compressor 21. Meanwhile, the cooling on-off valve 54 is closed so as to stop the operation of the cooler 51. Accordingly, the first compressor 21 is driven and rotated by the electric motor 23 such that air is sucked from the first intake pipe L1, the first compressor 21 compresses the air, and thereafter, the compressed air passes through the second compressor 31 of the second turbocharger 30 from the second intake pipe L2 and is supplied from the intake manifold 12 to the combustion chamber of the engine 11. A mixture of a fuel and the compressed air is ignited to be combusted in each combustion chamber, and thus, the engine 11 is driven, and exhaust gas is discharged to the exhaust manifold 13. The exhaust gas discharged from the exhaust manifold 13 to the third exhaust pipe L8 drives and rotates the second turbine 32 of the second turbocharger 30, and thus, the second compressor 31 is driven and rotated. The exhaust gas which has driven and rotated the second turbine 32 is discharged from the first exhaust pipe L3 to the outside through the bypass exhaust pipe L6. Accordingly, at the time of start of the engine 11, a rotation of the first turbine 22 of the first turbocharger 20 is stopped.

In this case, as a rotation speed of the electric motor 23 increases (dash-dotted line in FIG. 4), a rotation speed of a first compressor 21 increases, and as an intake amount and an amount of exhaust gas increase, a rotation speed of the second turbocharger 30 gradually increases. At a time t2, the rotation speed of the first compressor 21 of the first turbocharger 20 is constant, and if the driving of the electric motor 23 is stopped (dash-dotted line in FIG. 4) at a time t3 at which an engine load reaches a predetermined value, the rotation of the first compressor 21 decreases, and the intake on-off valve 25 is opened at a time t4 at which the driving of the electric motor 23 is stopped. Accordingly, air is sucked from the first intake pipe L1 to the second compressor 31 through the bypass intake pipe L5, and thus, only the second turbocharger 30 is driven.

Thereafter, if the engine load exceeds a predetermined value set in advance at a time t5, the exhaust on-off valve 26 is closed, and the exhaust gas from the second turbine 32 is introduced into the first turbine 22 through the first exhaust pipe L3. Accordingly, the first turbine 22 is driven and rotated by the exhaust gas and the generator 24 starts (dash-dotted line in FIG. 4) so as to be driven and rotated at a time t6. In addition, if the rotation speed of the first turbine 22 reaches the predetermined rotation speed set in advance at a time t7, the cooling on-off valve 54 is opened. That is, a portion of the cooling water of the engine is supplied from the third engine cooling water supply pipe 52 to the generator 24, and thus, the generator 24 is cooled. The engine load reaches a constant value at a time t8, and if the rotation speed of the second turbocharger 30 reaches a constant value at a time t9, this state is maintained.

If the required load of the engine decreases, at a time t10, the rotation speeds of the first turbine 22 and the second turbocharger 30 decrease, and thus, the engine load also decreases. Here, the cooling on-off valve 54 is closed, the supply of a portion of the cooling water of the engine from the third engine cooling water supply pipe 52 to the generator 24 is stopped, and the cooling of the generator 24 is stopped. If the rotation of the generator (a dash-dotted line in FIG. 4) is stopped at a time t11, the exhaust on-off valve 26 is opened at a time t12, and the exhaust gas which has driven and rotated the second turbine 32 is discharged from the first exhaust pipe L3 to the outside through the bypass exhaust pipe L6. Thereafter, the engine 11 is stopped at a time t13.

In this way, the turbocharging system of the first embodiment includes the first turbocharger 20, the second turbocharger 30, the electric motor 23 which is connected to a shaft end of the first compressor 21, a generator 24 which is connected to a shaft end of the first turbine 22, the bypass exhaust pipe L6 through which the exhaust gas bypasses the first turbine 22, the cooler 51 which cools the generator 24, and the control device 50 which operates the coolers 51, 71, and 81 when the generator 24 is driven by the exhaust gas which has driven the first turbine 22.

Accordingly, the coolers 51, 71, and 81 are operated when the generator 24 is driven by the exhaust gas which has driven the first turbine 22, and thus, the generator 24 is cooled by the coolers 51, 71, and 81, an increase in temperature of the generator 24 is suppressed, and it is possible to effectively cool the generator 24 so as to improve performance of the generator 24.

In the turbocharging system of the first embodiment, the control device 50 starts the operations of the coolers 51, 71, and 81 if the first turbine 22 (generator 24) reaches the predetermined rotation speed set in advance. Accordingly, the coolers 51, 71, and 81 are operated only when the generator 24 is to be cooled, and thus, efforts for operating the coolers 51, 71, and 81 can be prevented from being wastefully used.

In the turbocharging system of the first embodiment, the exhaust on-off valve 26 is provided in the bypass exhaust pipe L6, and the control device 50 operates the cooler 51, 71, and 81 after the exhaust on-off valve 26 is closed. Accordingly, the coolers 51, 71, and 81 are operated when an introduction destination of the exhaust gas from the second turbine 32 is switched from the bypass exhaust pipe L6 to the second exhaust pipe L4, and thus, the generator 24 is cooled by the coolers 51, 71, and 81 at an appropriate timing, and it is possible to appropriately suppress an increase in temperature of the generator 24.

In the turbocharging system of the first embodiment, the cooler 51 (71 and 81) includes the third and fourth engine cooling water supply pipes 52 and 53 (82 and 83, fifth engine cooling water supply pipe 84, and third and fourth intercooler cooling water supply pipes 72 and 73) through which the cooling water is introduced to the generator 24 so as to cool the generator 24, and the cooling on-off valve 54 (74 and 85) which is provided in the third engine cooling water supply pipe 52 (82, third intercooler cooling water supply pipe 72), and the control device 50 opens the cooling on-off valve 54 (74 and 85) when the generator 24 is driven. Accordingly, the cooler (71 and 81) is configured to introduce the cooling water to the generator 24 so as to cool the generator 24 and introduce the cooling water into the generator 24 when the generator 24 is driven so as to cool the generator 24, and thus, it is possible to effectively cool the generator 24 by a simple configuration.

The turbocharging system of the first embodiment includes the intercooler 41 which cools the compressed air pressurized by the second compressor 31, and the coolers 51, 71, and 81 introduce a portion of the cooling water fed to the intercooler 41 to the generator 24 so as to cool the generator 24. Accordingly, it is possible to suppress an increase in an equipment cost by using the cooling water of the existing equipment.

In the turbocharging system of the first embodiment, the coolers 51 and 81 introduce a portion of the cooling water of the engine 11 to the generator 24 so as to cool the generator 24. Accordingly, it is possible to suppress the increase in the equipment cost by using the cooling water of the existing equipment.

The turbocharging system of the first embodiment includes the first and second engine cooling water supply pipes 43 and 44 through which the cooling water circulates in the engine 11 so as to cool the engine 11 and the first and second intercooler cooling water supply pipes 62 and through which the cooling water is circulated to the intercooler 41 so as to cool the intake air pressurized by the second compressor 31, and the cooler 71 introduces a portion of the cooling water of the first intercooler cooling water supply pipe 62 to the generator 24 so as to cool the generator 24. Accordingly, in addition to the cooling water which cools the engine 11, a portion of the cooling water which cools only the intercooler 41 is introduced to the generator 24 so as to cool the generator 24, and thus, the generator 24 is cooled by the cooling water having a lower temperature. Therefore, it is possible to improve cooling efficiency of the generator 24.

In the turbocharging system of the first embodiment, the cooler 81 cools the generator 24 and the electric motor 23. Accordingly, the cooler 81 cools not only the generator 24 but also the electric motor 23, and thus, increases in temperature of the generator 24 and the electric motor 23 are suppressed. Therefore, it is possible to improve performance of the entire first turbocharger 20.

The turbocharging system of the first embodiment includes the temperature sensor 55 which measures the temperature of the generator 24, and the control device 50 operates the coolers 51, 71, and 81 if the temperature of the generator 24 measured by the temperature sensor 55 exceeds the preset upper limit temperature. Accordingly, the coolers 51, 71, and 81 are operated only when the generator 24 is to be cooled, and thus, efforts for operating the coolers 51, 71, and 81 can be prevented from being wastefully used.

In the turbocharging system of the first embodiment, the control device 50 adjusts the supply amount of the cooling water which is supplied to the generator 24 by the coolers 51, 71, and 81 according to the temperature of the generator 24 measured by the temperature sensor 55. Accordingly, the temperature of the generator 24 can be maintained at an appropriate temperature, overcooling of the generator 24 is suppressed, and thus, it is possible to prevent the coolers 51, 71, and 81 from being wastefully operated.

In addition, the internal combustion engine of the first embodiment includes the above-described turbocharging system. Accordingly, in the turbocharging system, the cooler 51 is operated when the generator 24 is driven by the exhaust gas which has driven the first turbine 22, the generator 24 is cooled by the cooler 51, and thus, an increase in temperature of the generator 24 is suppressed. Therefore, the generator 24 can be effectively cooled, performance of the generator 24 can be improved, and as a result, efficiency of the engine 11 can be improved.

Second Embodiment

Figure 5:
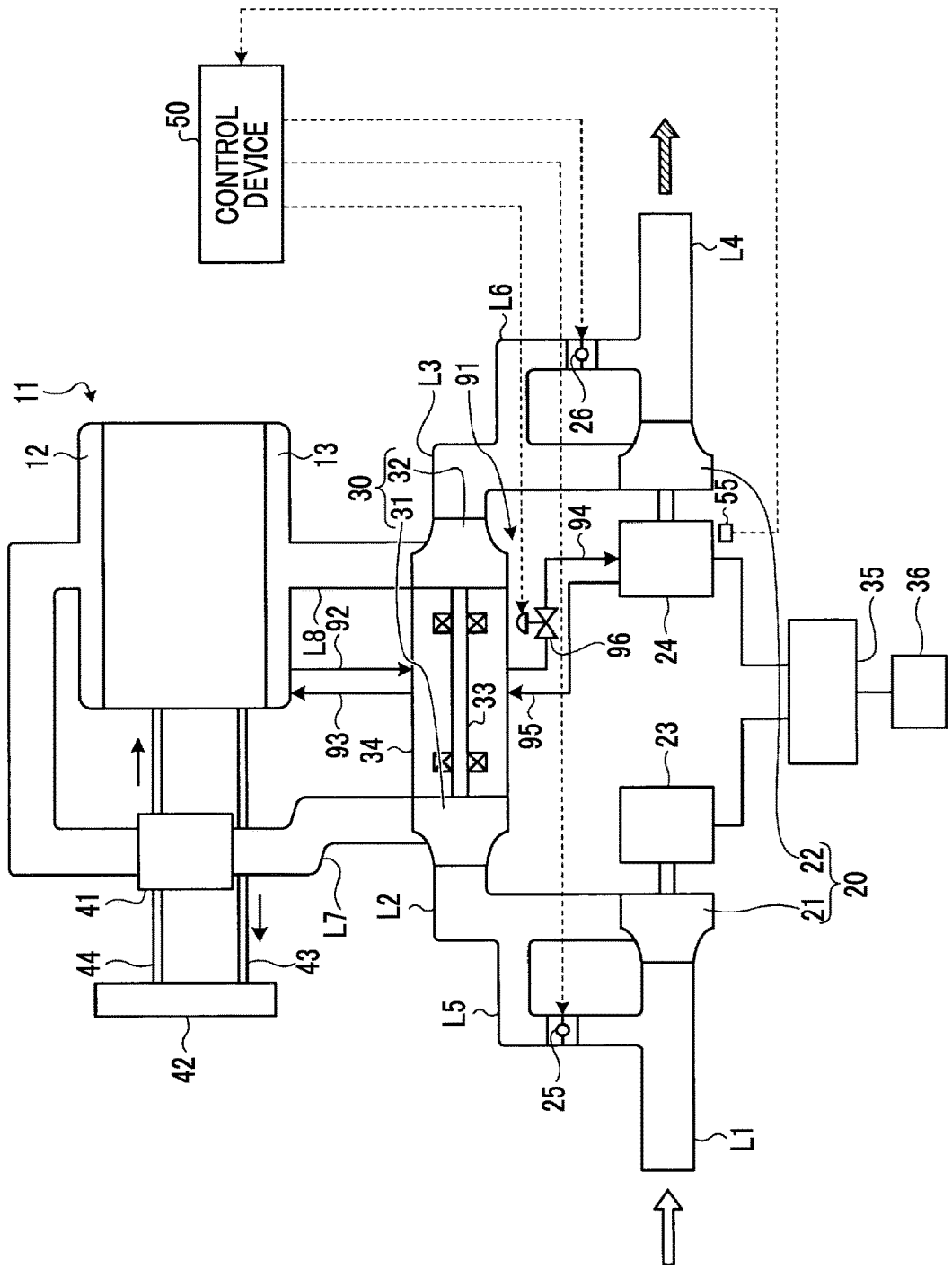
FIG. 5 is a schematic configuration diagram showing a turbocharging system of a second embodiment.

FIG. 5 is a schematic configuration diagram showing a turbocharging system of a second embodiment. In addition, the same reference numerals are assigned to the members having similar functions as those of the above-described embodiment, and detail descriptions thereof are omitted.

In the turbocharging system of the second embodiment, as shown in FIG. 5, a cooler 91 which cools the generator 24 introduces a portion of a cooling water which cools a bearing of the second turbocharger 30 to the generator 24 so as to cool the generator 24. That is, the second turbocharger 30 is configured such that the second compressor 31 and the second turbine 32 are connected to the rotating shaft 33, and the rotating shaft 33 is rotatably supported by a bearing device 34. For example, in the bearing device 34, a cooling jacket (not shown) is provided on an outer peripheral portion of the bearing device 34 as a bearing cooling device, and a fifth engine cooling water supply pipe 92 and a sixth engine cooling water supply pipe 93 extend from the water jacket of the engine body to the cooling jacket of the bearing device 34. In addition, in the bearing device 34, a seventh engine cooling water supply pipe 94 and an eighth engine cooling water supply pipe 95 extend to the generator 24, and a cooling on-off valve 96 is provided in the seventh engine cooling water supply pipe 94.

Accordingly, at the time of the driving of the engine 11, the cooling water of the water jacket is supplied from the fifth engine cooling water supply pipe to the bearing device 34 by the water pump so as to cool the bearing device 34 and is returned to the water jacket through the sixth engine cooling water supply pipe 93. In this case, if the cooling on-off valve 96 is opened, the cooling water supplied to the bearing device 34 is supplied from the seventh engine cooling water supply pipe 94 to the generator 24 so as to cool the generator 24 and is returned to the bearing device 34 by the eighth engine cooling water supply pipe 95.

When the generator 24 is driven by the exhaust gas which has driven the first turbine 22 of the first turbocharger 20, the control device 50 operates the cooler 91. That is, the control device 50 opens the cooling on-off valve 96 after the exhaust on-off valve 26 is closed. Therefore, a portion of the cooling water of the engine is supplied from the seventh engine cooling water supply pipe 94 to the generator 24 through the bearing device 34, and thus, the generator 24 can be cooled.

In addition, in the above-described descriptions, the cooling water which cools the engine 11 is supplied to the bearing device 34, and the cooling water supplied to the bearing device 34 is supplied to the generator 24 through the seventh engine cooling water supply pipe 94 so as to cool the generator 24. However, the present invention is not limited to this configuration. In a case where a cooling device which cools the engine 11 and a cooling device which cools the bearing device 34 are separately provided independently, a portion of the cooling water of the cooling device which cools the bearing device 34 may be supplied to the generator 24 so as to cool the generator 24.

In the way, in the turbocharging system of the second embodiment, the bearing cooling device which cools the bearing device 34 of the second turbocharger 30 to which the electric motor 23 or the generator 24 is not connected, and the cooler 91 introduces a portion of the cooling water which cools the bearing device 34 to the generator 24 so as to cool the generator 24.

Accordingly, it is possible to suppress the increase in the equipment cost by using the cooling water of the existing equipment.

Third Embodiment

Figure 6:
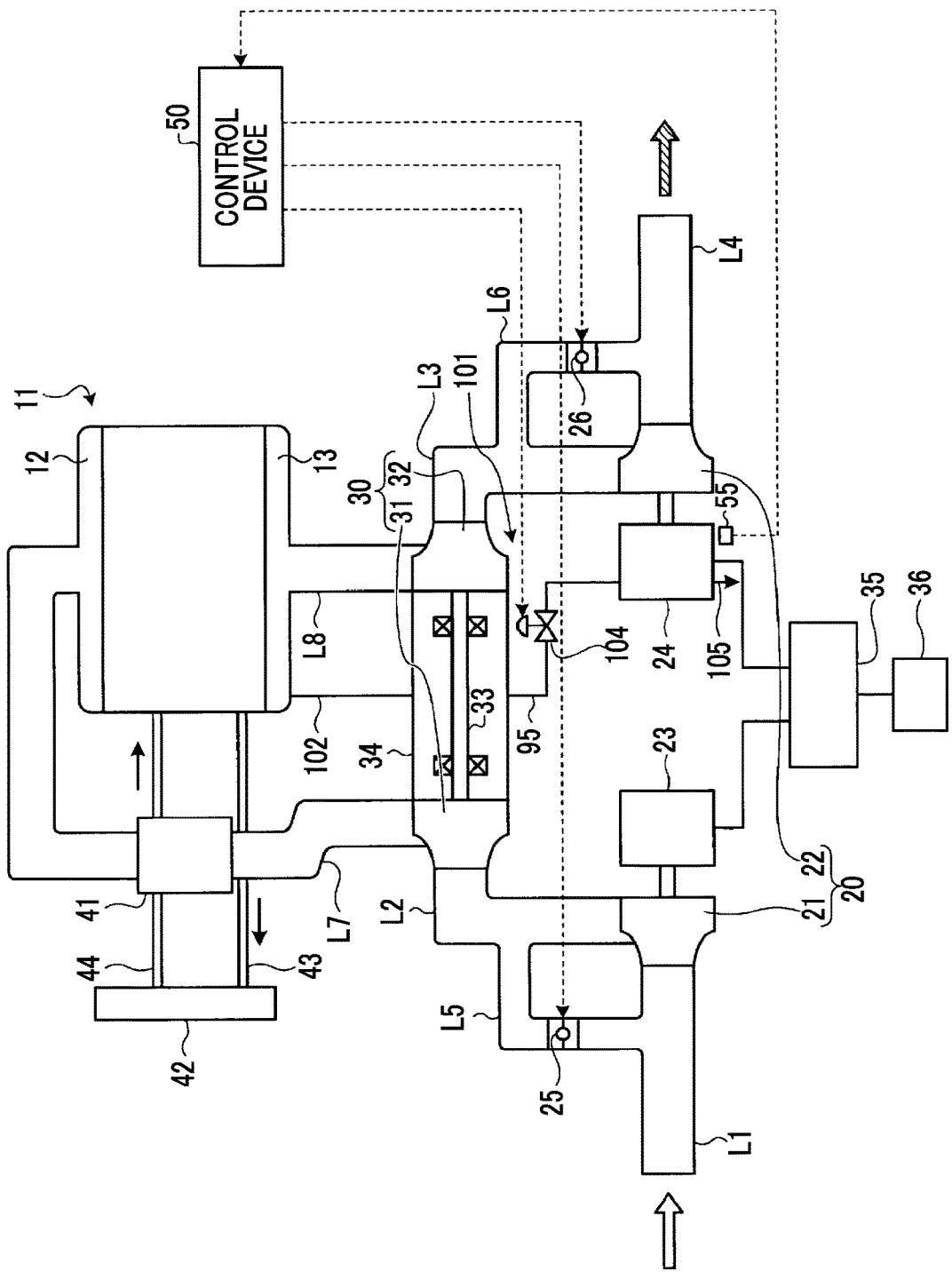
FIG. 6 is a schematic configuration diagram showing a turbocharging system of a third embodiment.

FIG. 6 is a schematic configuration diagram showing a turbocharging system of a third embodiment. In addition, the same reference numerals are assigned to the members having similar functions as those of the above-described embodiments, and detail descriptions thereof are omitted.

In the turbocharging system of the third embodiment, as shown in FIG. 6, a cooler 101 which cools the generator 24 introduces a portion of a lubricating oil in a bearing lubricating device which lubricates the bearing of the second turbocharger 30 to the generator 24 so as to cool the generator 24. That is, the second turbocharger 30 is configured such that the second compressor 31 and the second turbine 32 are connected to the rotating shaft 33, and the rotating shaft 33 is rotatably supported by a bearing device 34. In the engine 11, a first engine lubricating oil supply pipe 102 extends to the bearing device 34, and in the bearing device 34, a second engine lubricating oil supply pipe 103 extends to the generator 24, and a cooling on-off valve 104 is provided in the first engine lubricating oil supply pipe 102. In addition, in the generator 24, an engine lubricating oil discharge pipe 105 through which the lubricating oil is discharged to an oil pan (not shown) of the engine 11 is provided.

Accordingly, at the time of the driving of the engine 11, the lubricating oil of the engine 11 is supplied from the first engine lubricating oil supply pipe 102 to the bearing device 34 so as to lubricate the bearing device 34. In this case, if the cooling on-off valve 104 is opened, the lubricating oil supplied to the bearing device 34 is supplied from the second engine lubricating oil supply pipe 103 to the generator 24 so as to cool the generator 24 and is discharged to the oil pan through the engine lubricating oil discharge pipe 105.

When the generator 24 is driven by the exhaust gas which has driven the first turbine 22 of the first turbocharger 20, the control device 50 operates the cooler 101. That is, the control device 50 opens the cooling on-off valve 104 after the exhaust on-off valve 26 is closed. Therefore, a portion of the lubricating oil of the bearing device 34 is supplied from the second engine lubricating oil supply pipe 103 to the generator 24, and thus, the generator 24 can be cooled.

Moreover, in the above-described descriptions, the lubricating oil which lubricates the engine 11 is supplied to the bearing device 34, and the lubricating oil supplied to the bearing device 34 is supplied to the generator 24 through the second engine lubricating oil supply pipe 103 so as to cool the generator 24. However, the present invention is not limited to this configuration. In a case where a lubricating device which lubricates the engine 11 and a lubricating device which cools the bearing device 34 are separately provided independently, a portion of the lubricating oil of the lubricating device which lubricates the bearing device 34 may be supplied to the generator 24 so as to cool the generator 24.

In the way, in the turbocharging system of the third embodiment, the bearing lubricating device which lubricates the bearing device 34 of the second turbocharger 30 to which the electric motor 23 or the generator 24 is not connected is provided, and the cooler 101 introduces a portion of the lubricating oil which lubricates the bearing device 34 to the generator 24 so as to cool the generator 24.

Accordingly, it is possible to suppress the increase in the equipment cost by using the lubricating oil of the existing equipment as the cooling medium.

Fourth Embodiment

Figure 7:
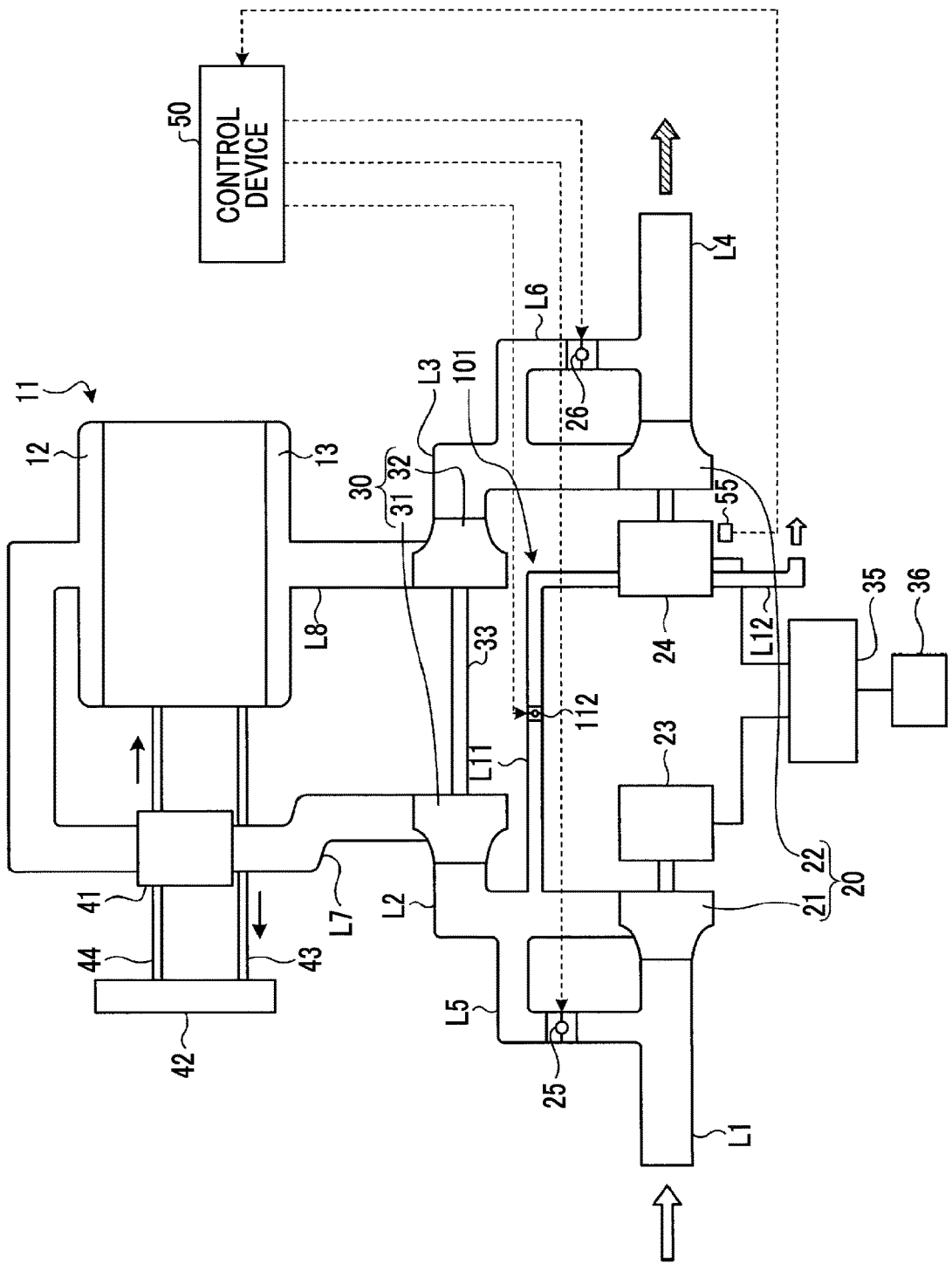
FIG. 7 is a schematic configuration diagram showing a turbocharging system of a fourth embodiment.
Figure 8:
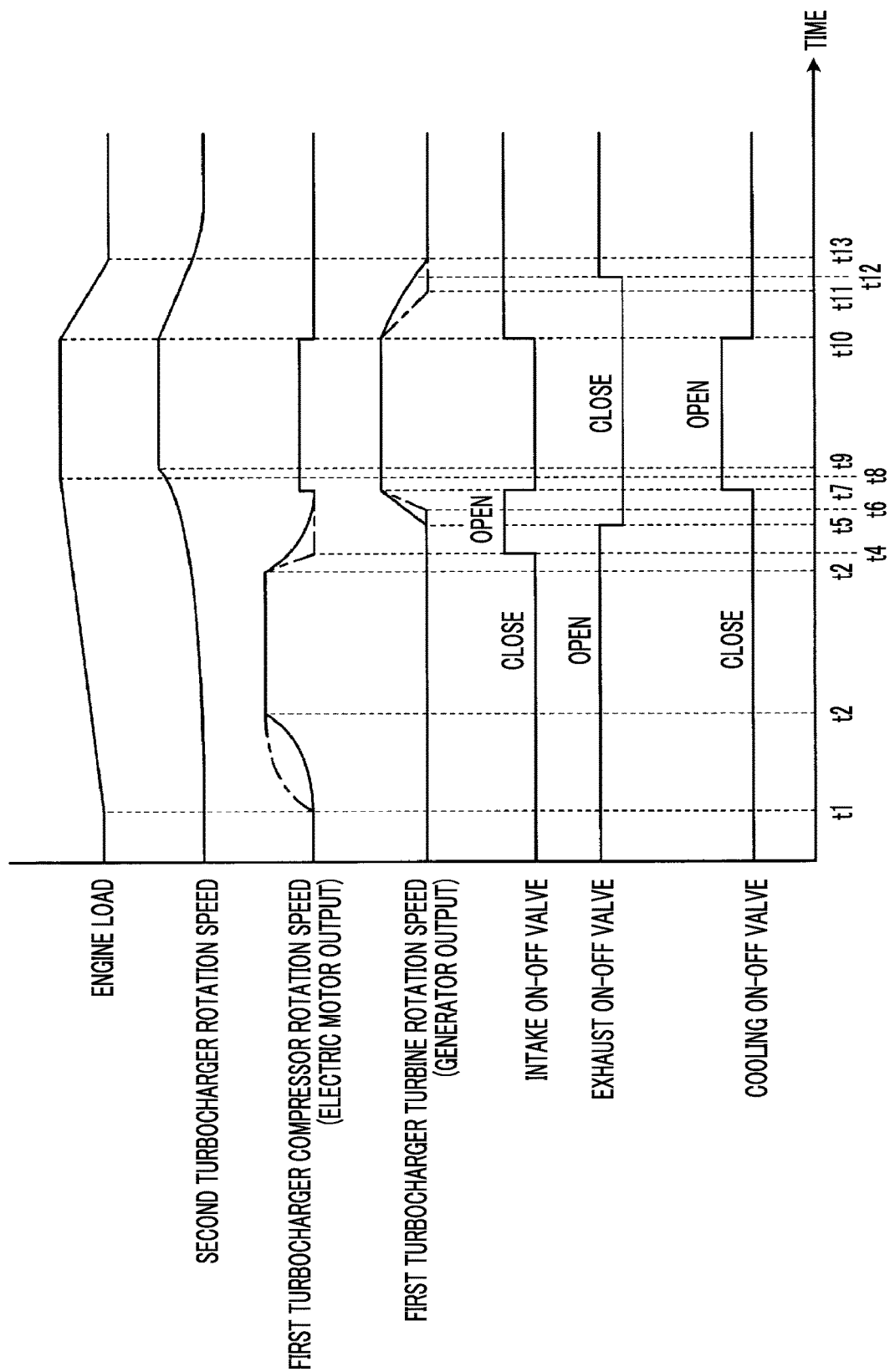
FIG. 8 is a time chart showing an operation method of the turbocharging system.

FIG. 7 is a schematic configuration diagram showing a turbocharging system of a fourth embodiment, and FIG. 8 is a time chart showing an operation method of the turbocharging system. In addition, the same reference numerals are assigned to the members having similar functions as those of the above-described embodiments, and detail descriptions thereof are omitted.

In the turbocharging system of the fourth embodiment, as shown in FIG. 7, a cooler 111 which cools the generator introduces a portion of compressed air generated by driving the first compressor 21 of the first turbocharger 20 using the electric motor 23 to the generator 24 so as to cool the generator 24. That is, the first turbocharger 20 includes the first compressor 21 and the first turbine 22, the electric motor 23 is connected to the rotating shaft of the first compressor 21, and the generator 24 is connected to the rotating shaft of the first turbine 22. In the first compressor 21, the first intake pipe L1 and the second intake pipe L2 are connected to each other, and the second intake pipe L2 is connected to the second compressor 31 of the second turbocharger 30. Moreover, the base end portion of the bypass intake pipe L5 is connected to the first intake pipe L1 and the other end thereof is connected to the second intake pipe L2.

A base end portion of a cooling intake pipe L11 is connected to an upstream side in a flow direction of an intake air from a connection portion between the second intake pipe L2 and the bypass intake pipe L5, a tip end portion of the cooling intake pipe L11 is connected to the generator 24, and a cooling on-off valve 112 is provided in an intermediate portion of the cooling intake pipe L11. In addition, a discharge pipe L12 through which the compressed air supplied from the cooling intake pipe L11 is discharged to the outside is connected to the generator 24.

Accordingly, at the time of the driving of the engine 11, if the first compressor 21 is driven and rotated by the electric motor 23, the air sucked from the first intake pipe L1 is compressed, and thereafter, the compressed air is supplied from the second intake pipe L2 to the second compressor 31 of the second turbocharger 30. In this case, if the cooling on-off valve 112 is opened, a portion of the air compressed by the first compressor 21 is supplied from the cooling intake pipe L11 to the generator 24 so as to cool the generator 24 and is discharged to the outside through the discharge pipe L12.

When the generator 24 is driven by the exhaust gas which has driven the first turbine 22 of the first turbocharger 20, the control device 50 operates the cooler 111. That is, the control device 50 drives the first compressor 21 by the electric motor 23 and opens the cooling on-off valve 112 after the exhaust on-off valve 26 is closed. Therefore, a portion of the air compressed by the first compressor 21 is supplied from the cooling intake pipe L11 to the generator 24, and thus, the generator 24 can be cooled.

If the operation of the turbocharging system of the present embodiment is described in detail, as shown in FIGS. 7 and 8, if the engine 11 starts at the time t1 and a required load of the engine increases, the exhaust on-off valve 26 is opened while the intake on-off valve 25 is closed, and thus, the electric motor 23 of the first turbocharger 20 is driven so as to drive and rotate the first compressor 21. Meanwhile, the cooling on-off valve 112 is closed so as to stop the operation of the cooler 111. Accordingly, the first compressor 21 is driven and rotated by the electric motor 23 such that air is sucked from the first intake pipe L1, the first compressor 21 compresses the air, and thereafter, the compressed air passes through the second compressor 31 of the second turbocharger 30 from the second intake pipe L2 and is supplied from the intake manifold 12 to the combustion chamber of the engine 11. The mixture of the fuel and the compressed air is ignited to be combusted in each combustion chamber, and thus, the engine 11 is driven, and exhaust gas is discharged to the exhaust manifold 13. The exhaust gas discharged from the exhaust manifold 13 to the third exhaust pipe L8 drives and rotates the second turbine 32 of the second turbocharger 30, and thus, the second compressor 31 is driven and rotated. The exhaust gas which has driven and rotated the second turbine 32 is discharged from the first exhaust pipe L3 to the outside through the bypass exhaust pipe L6. Accordingly, at the time of start of the engine 11, the rotation of the first turbine 22 of the first turbocharger 20 is stopped.

In this case, as the rotation speed of the electric motor 23 increases (dash-dotted line in FIG. 8), the rotation speed of the first compressor 21 increases, and as the intake amount and the amount of the exhaust gas increase, the rotation speed of the second turbocharger 30 gradually increases. At the time t2, the rotation speed of the first compressor 21 of the first turbocharger 20 is constant, and if the driving of the electric motor 23 is stopped (dash-dotted line in FIG. 8) at the time t3 at which the engine load reaches a predetermined value, the rotation of the first compressor 21 decreases, and the intake on-off valve 25 is opened at the time t4 at which the driving of the electric motor 23 is stopped. Accordingly, air is sucked from the first intake pipe L1 to the second compressor 31 through the bypass intake pipe L5, and thus, only the second turbocharger 30 is driven.

Thereafter, if the engine load exceeds a predetermined value set in advance at the time t5, the exhaust on-off valve 26 is closed, and the exhaust gas from the second turbine 32 is introduced into the first turbine 22 through the first exhaust pipe L3. Accordingly, the first turbine 22 is driven and rotated by the exhaust gas and the generator 24 starts (dash-dotted line in FIG. 8) so as to be driven and rotated at the time t6. In addition, if the rotation speed of the first turbine 22 reaches the predetermined rotation speed set in advance at the time t7, the first compressor 21 is driven and rotated by the electric motor 23, the intake on-off valve 25 is closed, and the cooling on-off valve 112 is opened. That is, a portion of the air compressed by the first compressor 21 is supplied to the generator 24 from the cooling intake pipe L11, and thus, the generator 24 is cooled. The engine load reaches a constant value at the time t8, and if the rotation speed of the second turbocharger 30 reaches a constant value at the time t9, this state is maintained.

If the required load of the engine decreases, at the time t10, the rotation speeds of the first turbine 22 and the second turbocharger 30 decrease, and thus, the engine load also decreases. Here, the driving and the rotation of the first compressor 21 are stopped by the electric motor 23, the intake on-off valve 25 is opened, the cooling on-off valve 112 is closed, the supply of a portion of the air compressed by the first compressor 21 from the cooling intake pipe L11 to the generator 24 is stopped, and thus, the cooling of the generator 24 is stopped. If the rotation of the generator 24 (a dash-dotted line in FIG. 8) is stopped at the time t11, the exhaust on-off valve 26 is opened at the time t12, and the exhaust gas which has driven and rotated the second turbine 32 is discharged from the first exhaust pipe L3 to the outside through the bypass exhaust pipe L6. Thereafter, the engine 11 is stopped at the time t13.

In addition, in the fourth embodiment, when the generator 24 is driven by the exhaust gas which has driven the first turbine 22, the intake on-off valve 25 is closed, and a portion of the air compressed by the first compressor 21 is supplied from the cooling intake pipe L11 to the generator 24. However, the present invention is not limited to this configuration. For example, the following configuration may be realized. That is, an on-off valve is provided between a connection portion between the second intake pipe L2 and the cooling intake pipe L11 and a connection portion between the second intake pipe L2 and the bypass intake pipe L5, and when the generator 24 is driven by the exhaust gas which has driven the first turbine 22, the intake on-off valve 25 is opened, the intake air is supplied to the second compressor 31 through the bypass intake pipe L5, and the air compressed by the first compressor 21 is supplied from the cooling intake pipe L11 to the generator 24.

In this way, in the turbocharging system of the fourth embodiment, the cooler 111 introduces a portion of the intake air pressurized by the first compressor 21 driven by the electric motor 23 to the generator 24 so as to cool the generator 24.

Accordingly, the cooling intake pipe L11 may be partially added, and it is possible to suppress the increase in the equipment cost.

Fifth Embodiment

Figure 9:
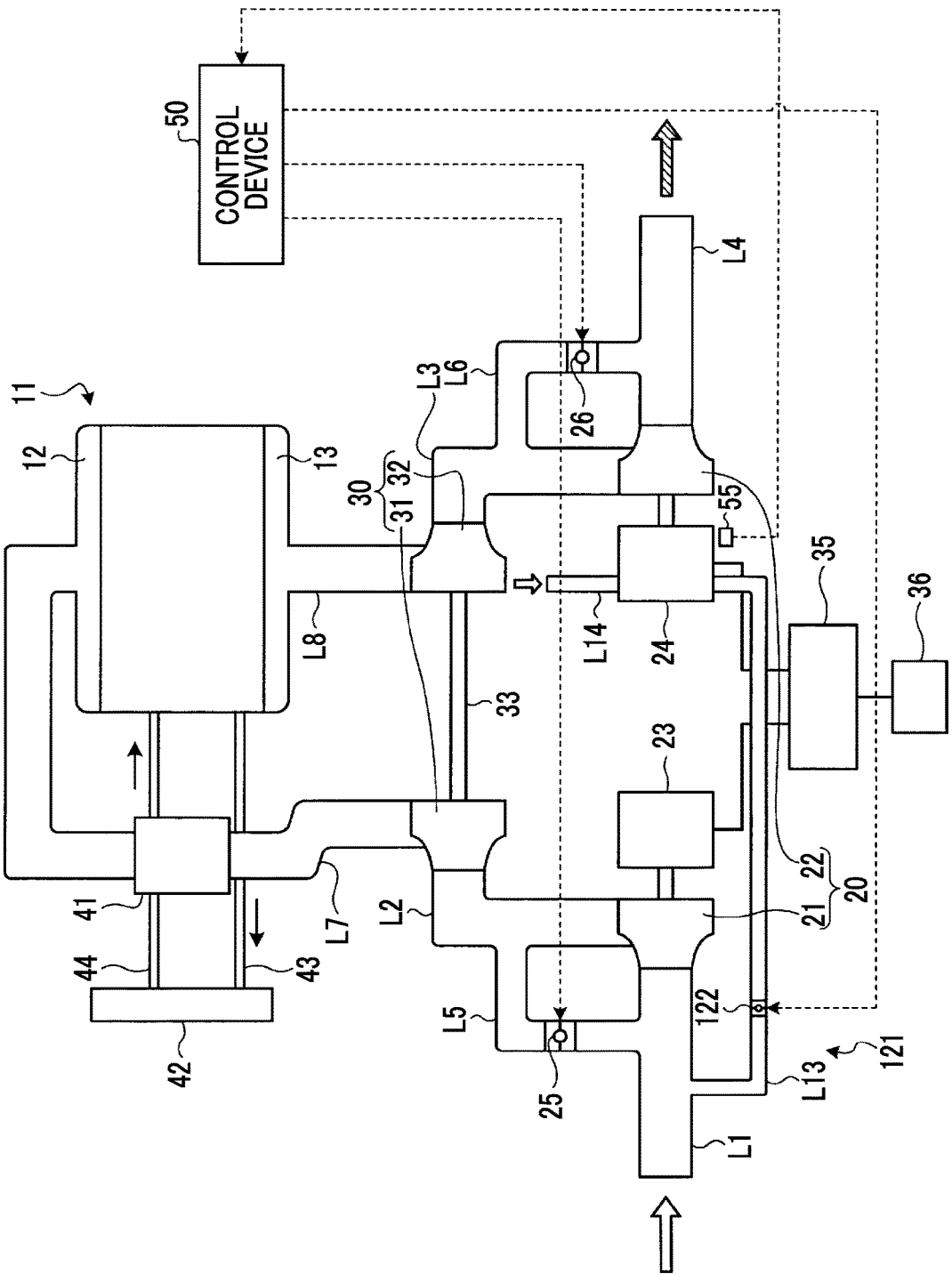
FIG. 9 is a schematic configuration diagram showing a turbocharging system of a fifth embodiment.

FIG. 9 is a schematic configuration diagram showing a turbocharging system of a fifth embodiment. In addition, the same reference numerals are assigned to the members having similar functions as those of the above-described embodiment, and detail descriptions thereof are omitted.

In the turbocharging system of the fifth embodiment, as shown in FIG. 9, the cooler 121 which cools the generator 24 sucks the outside air by a suction force generated by driving the first compressor 21 of the first turbocharger 20 using the electric motor 23 and introduces the sucked air to the generator 24 so as to cool the generator 24. That is, the first turbocharger 20 includes the first compressor 21 and the first turbine 22, the electric motor 23 is connected to the rotating shaft of the first compressor 21, and the generator 24 is connected to the rotating shaft of the first turbine 22.

A base end portion of a cooling intake pipe L13 is connected to an upstream side in the flow direction of the intake air from a connection portion between the first intake pipe L1 and the bypass intake pipe L5, a tip end portion of the cooling intake pipe L13 is connected to the generator 24, and a cooling on-off valve 122 is provided in an intermediate portion of the cooling intake pipe L13. In addition, an intake pipe L14 through which air is sucked from the outside by the suction force (negative pressure) applied from the cooling intake pipe L13 is connected to the generator 24.

Accordingly, at the time of the driving of the engine 11, if the first compressor 21 is driven and rotated by the electric motor 23, the air sucked from the first intake pipe L1 is compressed, and thereafter, the compressed air is supplied from the second intake pipe L2 to the second compressor 31 of the second turbocharger 30. In this case, if the cooling on-off valve 122 is opened, the suction force generated by the first compressor 21 is applied to the generator 24 and the intake pipe L14 through the cooling intake pipe L13 from the first intake pipe L1. Accordingly, the end portion of the intake pipe L14 is open to the outside, the outside air is sucked to be supplied to the generator 24 so as to cool the generator 24, and thus, the outside air is supplied to the first intake pipe L1 through the cooling intake pipe L13.

When the generator 24 is driven by the exhaust gas which has driven the first turbine 22 of the first turbocharger 20, the control device 50 operates the cooler 121. That is, the control device 50 drives the first compressor 21 by the electric motor 23 and opens the cooling on-off valve 122 after the exhaust on-off valve 26 is closed. Therefore, the suction force generated by the first compressor 21 is applied from the first intake pipe L1 to the generator 24 and the intake pipe L14 through the cooling intake pipe L13, the outside air is sucked from the intake pipe L14 to be supplied to the generator 24, and the generator 24 can be cooled.

Figure 10:
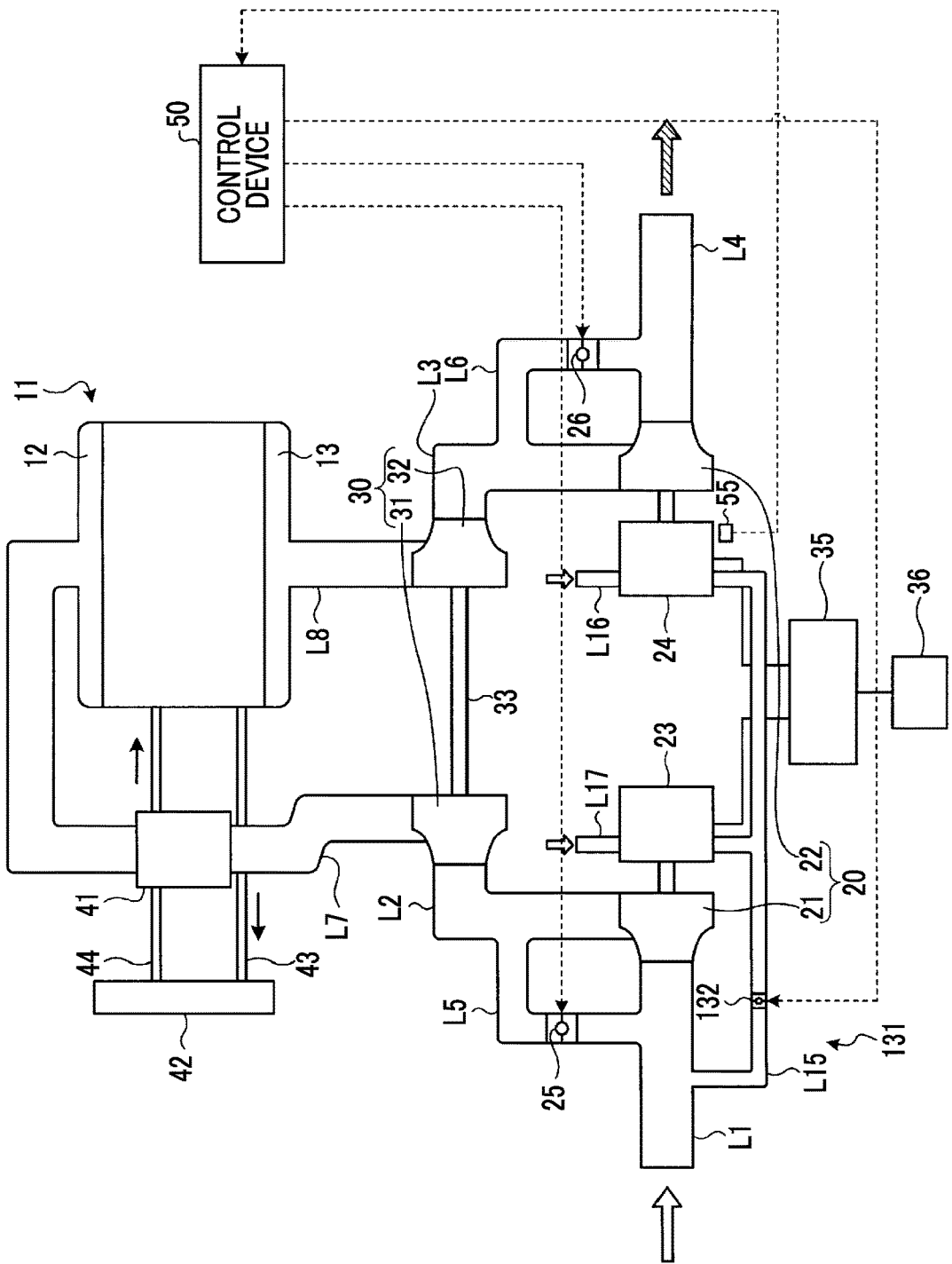
FIG. 10 is a schematic configuration diagram showing a turbocharging system of a first modification example of the fifth embodiment.

In addition, in the above-described descriptions, the air sucked from the outside is supplied to the generator 24 so as to cool the generator 24. However, the present invention is not limited to this. FIG. 10 is a schematic configuration diagram showing a turbocharging system of a first modification example of the fifth embodiment and FIG. 11 is a schematic configuration diagram showing a turbocharging system of a second modification example of the fifth embodiment.

In the first modification example of the fifth embodiment, as shown in FIG. 10, a cooler 131 which cools the generator 24 sucks the outside air by the suction force generated by driving the first compressor 21 of the first turbocharger 20 using the electric motor 23 and introduces the sucked outside air to the generator 24 and the electric motor 23 so as to cool the generator 24 and the electric motor 23. That is, a base end portion of a cooling intake pipe L15 is connected to an upstream side in a flow direction of an intake air from a connection portion between the first intake pipe L1 and the bypass intake pipe L5, a tip end portion of the cooling intake pipe L15 branches into two, one is connected to the generator 24, the other end is connected to the electric motor 23, and a cooling on-off valve 132 is provided in an intermediate portion of the cooling intake pipe L15. In addition, intake pipes L16 and L17 through which air is sucked from the outside by the suction force (negative pressure) applied from the cooling intake pipe L15 are connected to the generator 24 and the electric motor 23.

Accordingly, at the time of the driving of the engine 11, if the first compressor 21 is driven and rotated by the electric motor 23, the air sucked from the first intake pipe L1 is compressed, and thereafter, the compressed air is supplied from the second intake pipe L2 to the second compressor 31 of the second turbocharger 30. In this case, if the cooling on-off valve 132 is opened, the suction force generated by the first compressor 21 is applied to the generator 24, the intake pipe L16, the electric motor 23, and the intake pipe L17 through the cooling intake pipe L15 from the first intake pipe L1. Accordingly, the end portion of the intake pipe L16 is open to the outside, the outside air is sucked to be supplied to the generator 24 so as to cool the generator 24, and thus, the outside air is supplied to the first intake pipe L1 through the cooling intake pipe L15. In addition, the end portion of the intake pipe L17 is open to the outside, the outside air is sucked to be supplied to the electric motor 23 so as to cool the electric motor 23, and thus, the outside air is supplied to the first intake pipe L1 through the cooling intake pipe L15.

Figure 11:
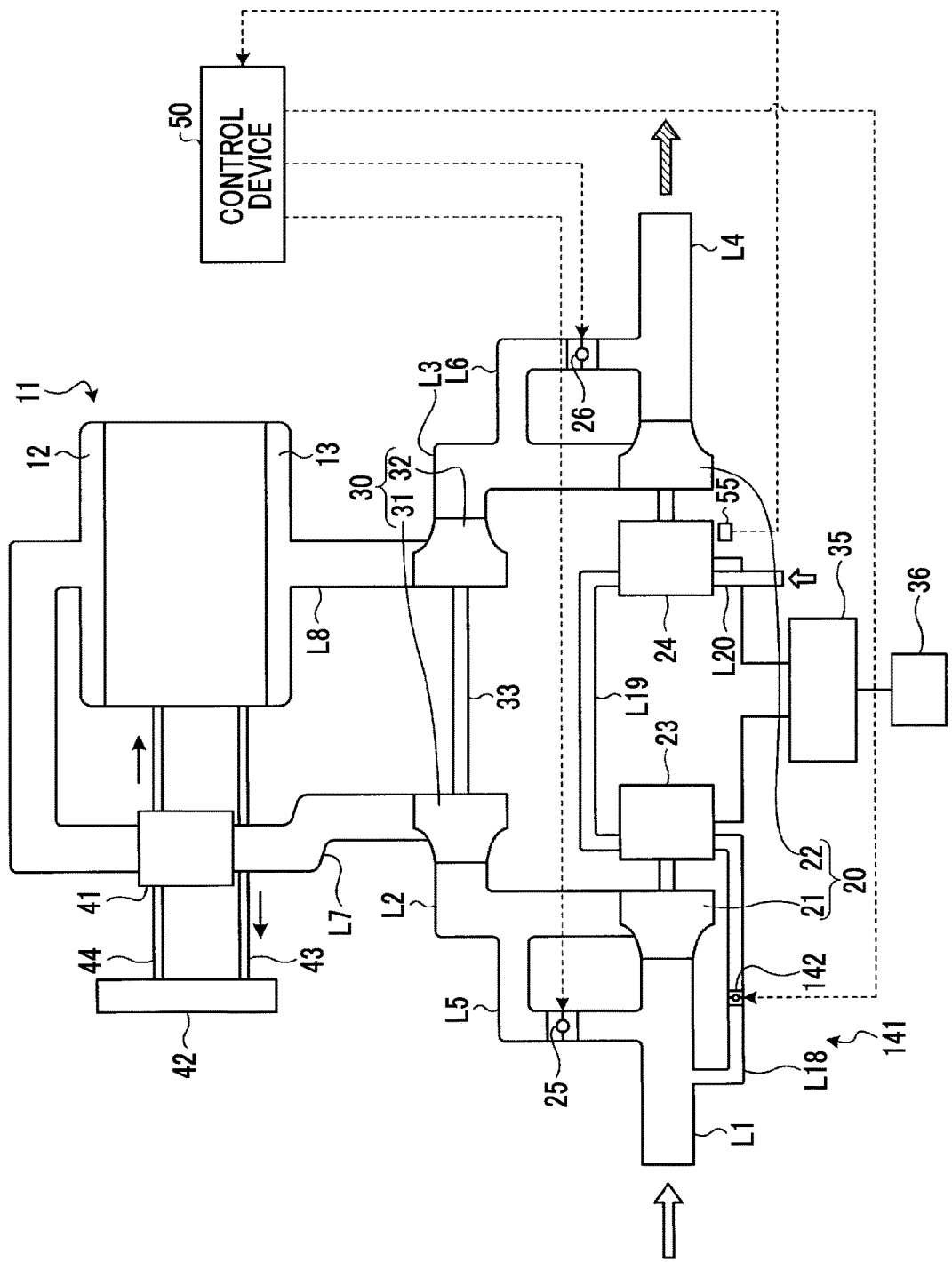
FIG. 11 is a schematic configuration diagram showing a turbocharging system of a second modification example of the fifth embodiment.

In addition, in the second modification example of the fifth embodiment, as shown in FIG. 11, a cooler 141 which cools the generator 24 sucks the outside air by the suction force generated by driving the first compressor 21 of the first turbocharger 20 using the electric motor 23 to introduce the outside air to the generator 24 and the electric motor 23 so as to cool the generator 24 and the electric motor 23. That is, a base end portion of a cooling intake pipe L18 is connected to an upstream side in a flow direction of an intake air from a connection portion between the first intake pipe L1 and the bypass intake pipe L5, a tip end portion of the cooling intake pipe L18 is connected to the electric motor 23, and a cooling on-off valve 142 is provided in an intermediate portion of the cooling intake pipe L18. In addition, the electric motor 23 is connected to the generator 24 by a connection pipe L19. Moreover, an intake pipe L20 through which air is sucked from the outside by a suction force (negative pressure) applied from the cooling intake pipe L18 and the connection pipe L19 is connected to the generator 24.

Accordingly, at the time of the driving of the engine 11, if the first compressor 21 is driven and rotated by the electric motor 23, the air sucked from the first intake pipe L1 is compressed, and thereafter, the compressed air is supplied from the second intake pipe L2 to the second compressor 31 of the second turbocharger 30. In this case, if the cooling on-off valve 142 is opened, the suction force generated by the first compressor 21 is applied from the first intake pipe L1 to the electric motor 23 through the cooling intake pipe L18 and is applied to the generator 24 and the intake pipe L20 via the connection pipe L19. Accordingly, the end portion of the intake pipe L20 is open to the outside, the outside air is sucked to be supplied to the generator 24 so as to cool the generator 24, is supplied to the electric motor through the connection pipe L19 so as to cool the electric motor 23, and is supplied to the first intake pipe L1 through the cooling intake pipe L18.

In the turbocharging system of the fifth embodiment, the coolers 121, 131, and 141 suck the outside air by the suction force generated by the first compressor 21 to which the electric motor 23 is connected, and the sucked air is introduced to the generator 24 so as to cool the generator 24.

Accordingly, the cooling intake pipes L13, L15, and L18 may be partially added, and it is possible to suppress the increase in the equipment cost.

In addition, in the above-described embodiments, the control device 50 introduces the exhaust gas into the first turbine 22 by closing the exhaust on-off valve 26 when the engine 11 is in a high load operation state, and after a predetermined time has elapsed, if the rotation speed of the first turbine 22 reaches the predetermined rotation speed, the control device 50 operates the coolers 51, 71, 81, 91, 101, 111, 121, 131, and 141. However, the present invention is not limited to this configuration. For example, the control device 50 may introduce the exhaust gas into the first turbine 22 by closing the exhaust on-off valve 26, and if a predetermined time set by a timer elapses, the control device 50 may operate the coolers 51, 71, 81, 91, 101, 111, 121, 131, and 141. In addition, the control device 50 may close the exhaust on-off valve 26 to introduce the exhaust gas into the first turbine 22 and may simultaneously operate the coolers 51, 71, 81, 91, 101, 111, 121, 131, and 141. In addition, the control device 50 operates the coolers 51, 71, 81, 91, 101, 111, 121, 131, and 141 only when the generator 24 is operated. However, if the generator 24 is disposed in the vicinity of the exhaust system, the control device 50 may operate the coolers 51, 71, 81, 91, 101, 111, 121, 131, and 141 so as to cool the generator 24 when the generator 24 is not operated, that is, at all times.

In addition, in the above-described embodiments, the electric motor 23 is connected to the shaft end of the first compressor 21 of the first turbocharger 20, and the generator 24 is connected to the shaft end of the first turbine 22. However, the electric motor 23 is connected to the shaft end of the second compressor 31 of the second turbocharger 30 and the generator 24 may be connected to the shaft end of the second turbine 32. Moreover, the first turbocharger 20 is the low-pressure turbocharger and the second turbocharger 30 is the high-pressure turbocharger. However, the first turbocharger 20 may be the high-pressure turbocharger and the second turbocharger 30 may be the low-pressure turbocharger.

REFERENCE SIGNS LIST

11: engine (internal combustion engine)
20: first turbocharger
21: first compressor
22: first turbine
23: electric motor
24: generator
25: intake on-off valve
26: exhaust on-off valve
30: second turbocharger
31: second compressor
32: second turbine
33: rotating shaft
34: bearing device
35: AC/DG/AC converter (converter)
36: capacitor
41: intercooler
42, 61: radiator
43: first engine cooling water supply pipe (internal combustion engine cooling line)
44: second engine cooling water supply pipe (internal combustion engine cooling line)
51, 71, 81, 91, 101, 111, 121, 131, 141: cooler
52, 82: third engine cooling water supply pipe
53, 83: fourth engine cooling water supply pipe
54, 74, 85, 96, 104, 112, 122, 132, 142: cooling on-off valve
62: first intercooler cooling water supply pipe (intercooler cooling line)
63: second intercooler cooling water supply pipe (intercooler cooling line)
72: third intercooler cooling water supply pipe
73: fourth intercooler cooling water supply pipe
84, 92: fifth engine cooling water supply pipe
93: sixth engine cooling water supply pipe
94: seventh engine cooling water supply pipe
95: eighth engine cooling water supply pipe
102: first engine lubricating oil supply pipe
103: second engine lubricating oil supply pipe
L1: first intake pipe (first intake line)
L2: second intake pipe (second intake line)
L3: first exhaust pipe (first exhaust line)
L4: second exhaust pipe (second exhaust line)
L5: bypass intake pipe (bypass intake line)
L6: bypass exhaust pipe (bypass exhaust line)
L7: third intake pipe (third intake line)
L8: third exhaust pipe (third exhaust line)
L11, L13, L15, L18: cooling intake pipe

The invention claimed is:
1. A turbocharging system comprising:
a first compressor and a first turbine;
a second compressor and a second turbine;
an intake line through which intake air pressurized by the first compressor is supplied to the second compressor;
an exhaust line through which exhaust gas which has driven the second turbine is supplied to the first turbine;
an electric motor which is connected to one of a shaft end of the first compressor and a shaft end of the second compressor;
a generator which is connected to one of a shaft end of the first turbine and a shaft end of the second turbine;
a bypass exhaust line through which the exhaust gas bypasses the one of the first turbine and the second turbine to which the generator is connected;
a cooler which cools the generator; and
a control device which operates the cooler when the generator is driven by the exhaust gas which has driven the one of the first turbine and the second turbine,
wherein the one of the first compressor and the second compressor, to which the electric motor is connected, and the one of the first turbine and the second turbine, to which the generator is connected, are rotated independently from one another, wherein the other one of the first compressor and the second compressor is coaxially connected to the other one of the first turbine and the second turbine, wherein an exhaust on-off valve is provided in the bypass exhaust line, wherein the cooler includes a cooling line through which a cooling medium is introduced to the generator so as to cool the generator and a cooling on-off valve which is provided in the cooling line, and the control device closes the cooling on-off valve to stop an operation of the cooler when the exhaust on-off valve is in an open state, and the control device opens the cooling on-off valve to operate the cooler when the exhaust on-off valve is in a closed state to drive the generator.

2. The turbocharging system according to claim 1, wherein the control device starts an operation of the cooler when the generator reaches a predetermined rotation speed set in advance.

3. The turbocharging system according to claim 1, further comprising:
an intercooler which cools the intake air pressurized by the second compressor,
wherein the cooler introduces a portion of a cooling medium of the intercooler to the generator so as to cool the generator.

4. The turbocharging system according to claim 3, wherein the cooler introduces a portion of the cooling medium of the internal combustion engine to the generator so as to cool the generator.

5. The turbocharging system according to claim 3, further comprising:
an internal combustion engine cooling line through which a cooling medium circulates through the internal combustion engine so as to cool the internal combustion engine; and
an intercooler cooling line through which the cooling medium circulates through the intercooler so as to cool the intake air pressurized by the second compressor,
wherein the cooler introduces a portion of the cooling medium of the intercooler cooling line to the generator so as to cool the generator.

6. The turbocharging system according to claim 1, wherein a bearing cooling device which cools a bearing of the first turbine or the second turbine is provided, and the cooler introduces a portion of the cooling medium of the bearing cooling device to the generator so as to cool the generator.

7. The turbocharging system according to claim 1, wherein a bearing lubricating device which lubricates a bearing of the first turbine or the second turbine is provided, and the cooler introduces a portion of a lubricating medium of the bearing lubricating device to the generator so as to cool the generator.

8. The turbocharging system according to claim 1, wherein the cooler introduces a portion of the intake air pressurized by the first compressor or the second compressor driven by the electric motor to the generator so as to cool the generator.

9. The turbocharging system according to claim 1, wherein the cooler sucks outside air by a suction force generated by the first compressor or the second compressor to which the electric motor is connected, and introduces the outside air to the generator so as to cool the generator.

10. The turbocharging system according to claim 1, wherein the cooler cools the generator and the electric motor.

11. The turbocharging system according to claim 1, further comprising:
a temperature sensor which measures a temperature of the generator,
wherein the control device operates the cooler if the temperature of the generator measured by the temperature sensor exceeds a preset upper limit temperature.

12. The turbocharging system according to claim 11, wherein the control device adjusts a supply amount of a cooling medium supplied to the generator by the cooler according to the temperature of the generator measured by the temperature sensor.

13. An internal combustion engine comprising:
the turbocharging system according to claim 1.

14. The turbocharging system according to claim 2, further comprising:
an intercooler which cools the intake air pressurized by the second compressor,
wherein the cooler introduces a portion of a cooling medium of the intercooler to the generator so as to cool the generator.

15. The turbocharging system according to claim 1, further comprising:
an intercooler which cools the intake air pressurized by the second compressor,
wherein the cooler introduces a portion of a cooling medium of the intercooler to the generator so as to cool the generator.

* * * * *